United States Patent
Kitamura

(10) Patent No.: US 7,921,987 B2
(45) Date of Patent: Apr. 12, 2011

(54) BELT DRIVE DEVICE AND IMAGE FORMING APPARATUS

(75) Inventor: Makoto Kitamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 411 days.

(21) Appl. No.: 11/289,358

(22) Filed: Nov. 30, 2005

(65) Prior Publication Data

US 2006/0119029 A1   Jun. 8, 2006

(30) Foreign Application Priority Data

Dec. 2, 2004   (JP) .................... 2004-349718

(51) Int. Cl.
*B65H 5/02* (2006.01)
*B65G 39/16* (2006.01)

(52) U.S. Cl. .................. 198/806; 198/807; 198/810.03; 271/275

(58) Field of Classification Search ............. 198/806, 198/807; 271/275
See application file for complete search history.

(56) References Cited

U.S. PATENT DOCUMENTS

| 2,705,136 | A | | 3/1955 | Glitsch | |
|---|---|---|---|---|---|
| 2,797,907 | A | | 7/1957 | De Bie | |
| 4,192,835 | A | | 3/1980 | Powers | |
| 5,157,444 | A | * | 10/1992 | Mori et al. | 399/329 |
| 5,471,289 | A | * | 11/1995 | Satoh et al. | 399/328 |
| 5,942,162 | A | | 8/1999 | Gamborg et al. | |
| 2003/0045966 | A1 | * | 3/2003 | Ubaldi | 700/213 |
| 2003/0219280 | A1 | * | 11/2003 | Lee | 399/167 |

FOREIGN PATENT DOCUMENTS

| DE | 739 358 | | 9/1943 |
|---|---|---|---|
| DE | 39 39 267 | A1 | 5/1991 |
| EP | 1 437 175 | A2 | 7/2004 |
| JP | 11-322112 | | 11/1999 |
| JP | 2002-023518 | | 1/2002 |
| WO | WO 02/085504 | A1 | 10/2002 |

* cited by examiner

*Primary Examiner* — Gene Crawford
*Assistant Examiner* — Kavel Singh
(74) *Attorney, Agent, or Firm* — Rabin & Berdo, P.C.

(57) ABSTRACT

A belt drive device includes a plurality of rollers and an endless belt stretched around the rollers, and configured to drive the endless belt by rotating the rollers. The belt drive device further includes a roller-shaft shifting member that shifts at least one end of a shaft of at least one roller of the above described rollers in accordance with the movement of the endless belt in the axial direction of the roller.

18 Claims, 20 Drawing Sheets

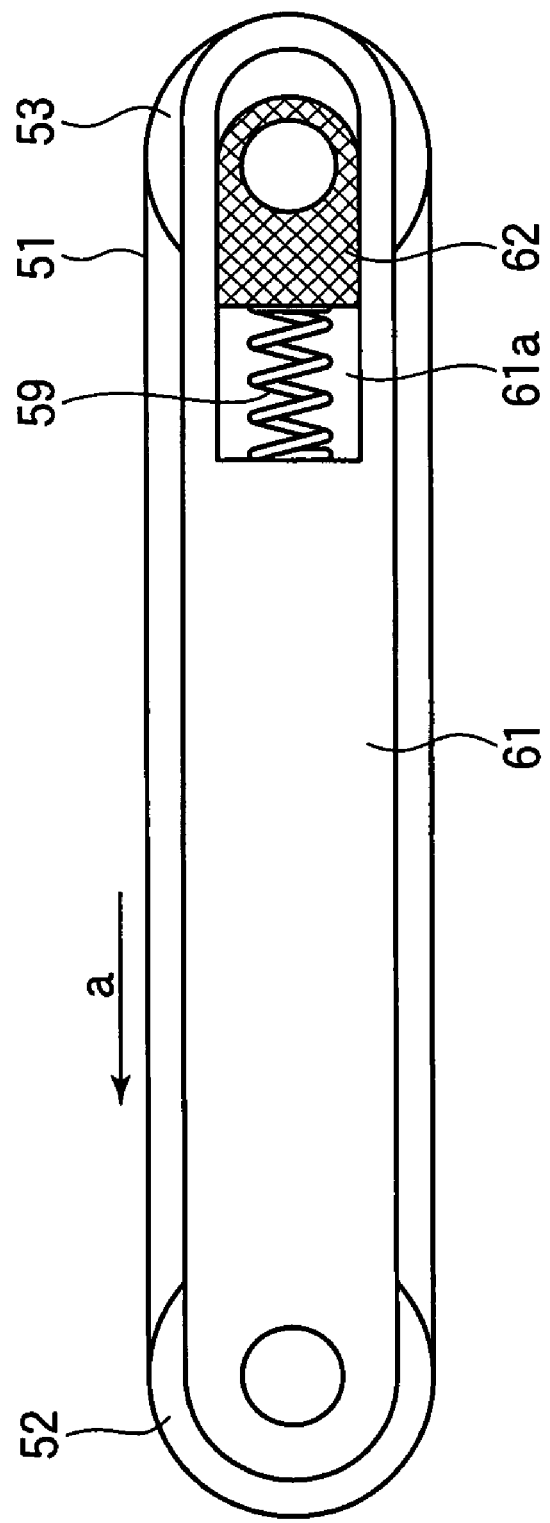

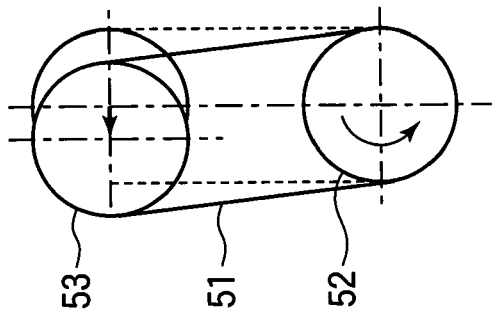
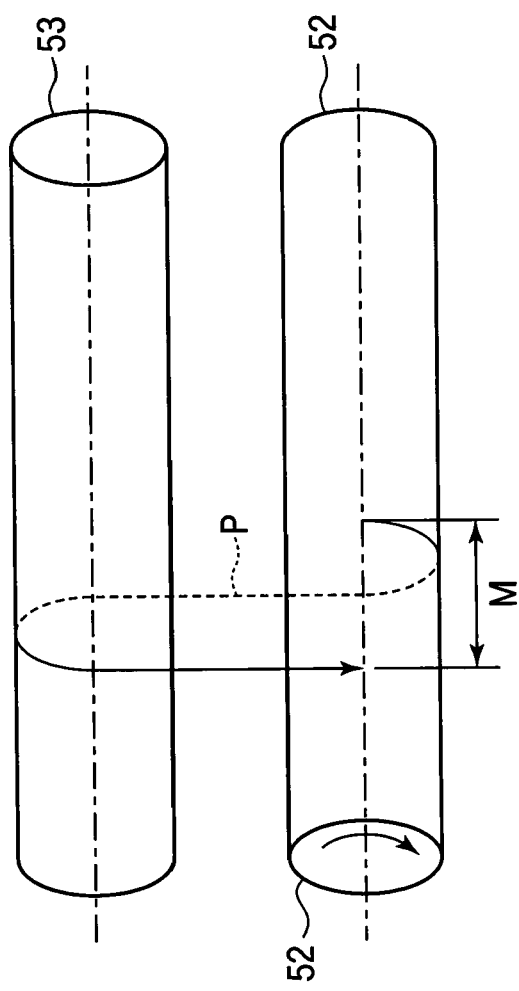

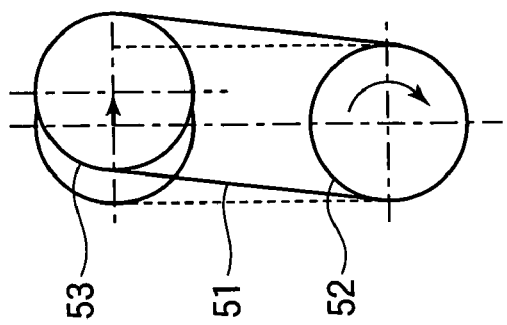
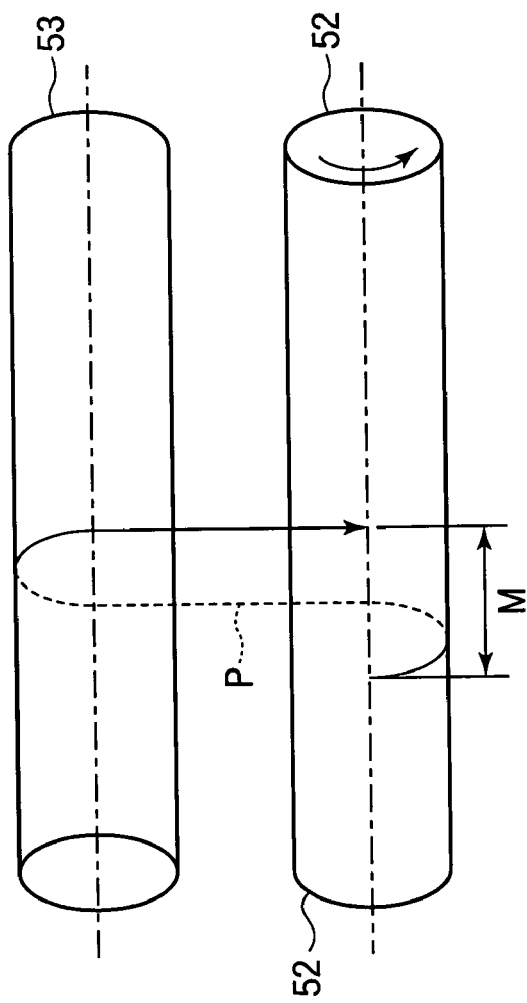
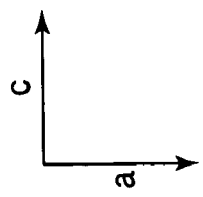

BELT DRIVE DEVICE AND IMAGE FORMING APPARATUS

BACKGROUND OF THE INVENTION

This invention relates to a belt drive device and an image forming apparatus having the belt drive device.

A conventional electrophotographic image forming apparatus uses an endless belt for feeding a recording media to an image forming portion in which an image is formed on the recording media. Such an image forming apparatus includes a belt drive device having the endless belt adjacent to the image forming portion. The belt drive device feeds the recording media to the image forming portion by moving the endless belt that absorbs the recording media, so that the image is formed on the recording media in the image forming portion.

The belt drive device includes two rollers (provided in parallel to each other) around which the endless belt is stretched, and drives at least one of the two rollers to thereby move the endless belt. However, there is a possibility that a skewing of the endless belt may occur, depending on a parallelism between the two rollers, an imbalance of tension applied to the endless belt, a dimensional accuracy of the rollers, or the like.

In order to prevent the skewing of the endless belt, there is proposed a belt drive device having a pulley coaxially provided on the roller. The pulley is rotatable about the rotation axis of the roller, but does not move in the axial direction of the roller. Further, a bead is provided on the inner circumference of the lateral end of the endless belt, and engages a groove formed on the pulley. Such a belt drive device is disclosed in, for example, Japanese Laid-Open patent publication No. 2002-23518.

However, since the conventional belt drive device prevents the skewing of the endless belt by means of the engagement between the bead and the groove of the pulley, the friction between the bead and the pulley may increase when the force of the skewing increases. In such a case, the bead may be worn, and the worn bead may move out of the groove of the pulley, with the result that the endless belt may be dropped out of the pulley. Once the endless belt is dropped out of the pulley, the belt drive device does not recover its original condition by itself, and therefore an expensive replacement of belt drive device is inevitable.

SUMMARY OF THE INVENTION

An object of the present invention is to provide a belt drive device and an image forming apparatus capable of preventing the skewing of an endless belt to thereby prevent the wearing of a component (for example, a bead), so as to prevent the endless belt from being dropped out of the pulley.

According to the present invention, there is provided a belt drive device including a plurality of rollers, an endless belt stretched around the rollers and driven by the rollers, and a roller-shaft shifting member that shifts at least one end of a shaft of at least one roller of the plurality of rollers in accordance with the movement of the endless belt in the axial direction of the roller.

With such an arrangement, it becomes possible to prevent the skewing of the endless belt. In a configuration in which a bead on the inner circumference of the endless belt engages a groove of a pulley, the wearing of the bead can be restricted. Therefore, it becomes possible to prevent the bead from moving out of the groove of the pulley, and to prevent the endless belt from being dropped out of the pulley.

BRIEF DESCRIPTION OF THE DRAWINGS

In the attached drawings:

FIG. 3 is a side view showing the basic configuration of the belt drive device according to the first embodiment of the present invention;

FIGS. 4A and 4B are schematic views illustrating the skewing of the transfer belt according to the first embodiment of the present invention;

FIGS. 5A and 5B are schematic views illustrating the skewing of the transfer belt according to the first embodiment of the present invention;

DETAILED DESCRIPTION OF THE PREFERRED EMBODIMENT

Embodiments of the present invention will be described with reference to the attached drawings.

First Embodiment

Figure 1:
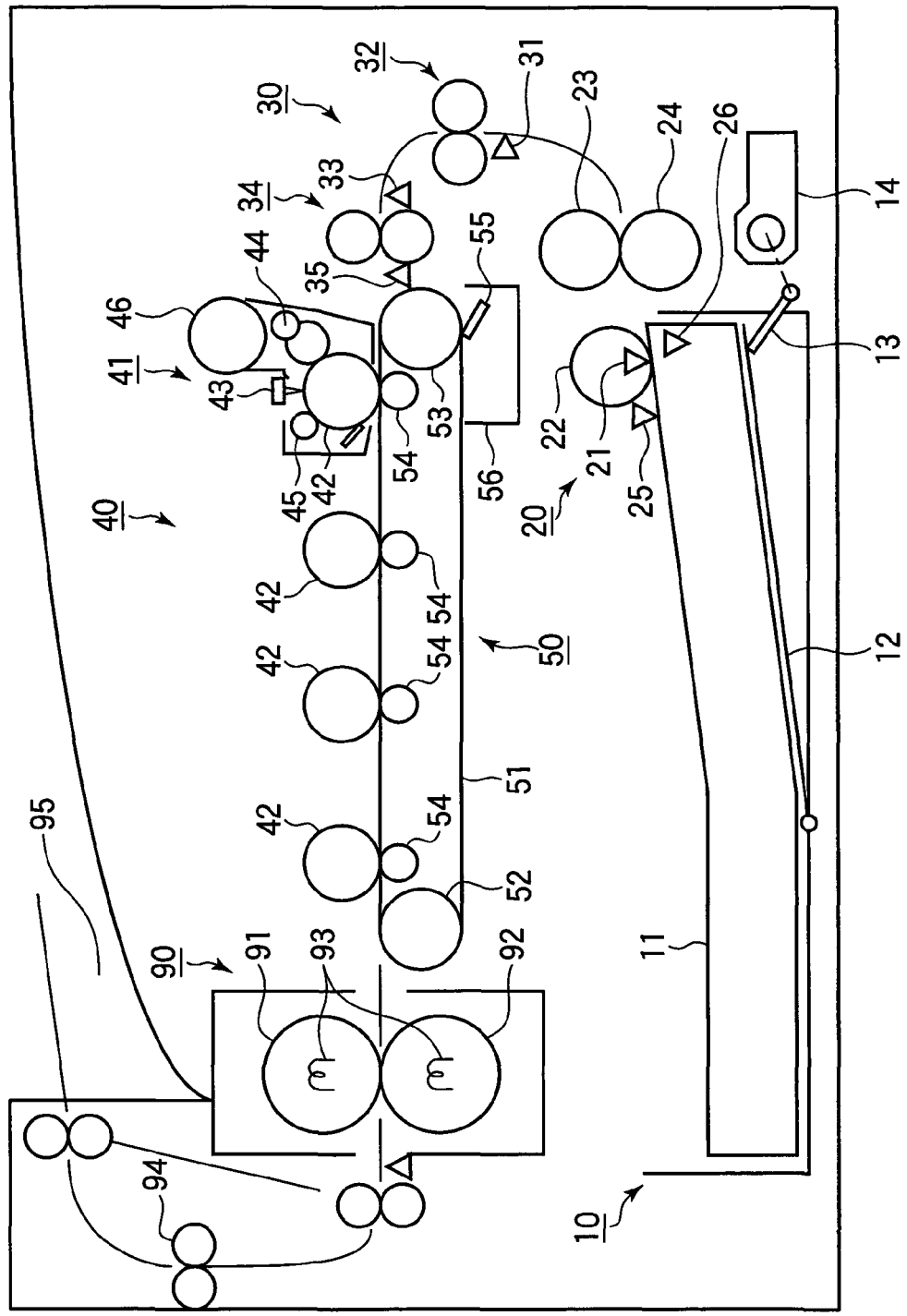
FIG. 1 is a schematic view of an image forming apparatus according to the first embodiment of the present invention.

FIG. 1 is a schematic view of an image forming apparatus according to the first embodiment of the present invention.

As shown in FIG. 1, a sheet tray 10 is detachably attached to the image forming apparatus. Sheets 11 (i.e., recording media) are stacked in the sheet tray 10. In the sheet tray 10, a sheet stacker plate 12 is rotatably supported by a not shown support shaft, and the sheets 11 are stacked on the sheet stacker plate 12. Guide members (not shown) are provided in the sheet tray 10 for defining the stacking position of the sheets 11. The guide members determine the stacking position of the sheets 11 in the lateral direction perpendicular to the feeding direction of the sheets 11, and the stacking position of the sheets 11 in the feeding direction of the sheets 11 (i.e., to the right in FIG. 1).

A lift-up lever 13 is disposed at an exit side of the sheet tray 10, and is rotatably supported by a not shown support shaft. The support shaft is disconnectably connected to a motor 14. When the sheet tray 10 is attached to the image forming apparatus, the lift-up lever 13 and the motor 14 are connected to each other, and the motor 14 is driven by a not shown controller. With this, the lift-up lever 13 swings upward, and the tip of the lift-up lever 13 pushes the bottom of the sheet stacker plate 12 upward, so that the sheets 11 stacked on the sheet stacker plate 12 are lifted. When the sheets 11 reach to a predetermined height, a lift detecting portion 21 detects the sheets 11, and the controller stops the motor 14 based on an information signal sent from the lift detecting portion 21.

A sheet feeding portion 20 is disposed on the feeding side of the sheet tray 10, and feeds the successive uppermost sheets 11 to the outside of the sheet tray 10. The sheet feeding portion 20 includes a pickup roller 22 so disposed that the uppermost sheet 11 (lifted to a predetermined height) is pushed against the pickup roller 22. The sheet feeding portion 20 further includes a pair of rollers, i.e., a feed roller 23 and a retard roller 24 for separating the sheets 11 (fed by the pickup roller 22) from each other. The sheet feeding portion 20 further includes a sheet presence detecting portion 25 for detecting the presence and absence of the sheets 11 in the sheet tray 10, and a sheet remaining amount detecting portion 26 for detecting the remaining amount of the sheets 11 in the sheet tray 10.

The sheet 11 individually fed by the sheet feeding portion 20 reaches a sheet carrying portion 30. In the sheet carrying portion 20, the sheet 11 passes a sheet sensor 31, and is carried to a pair of carrying rollers 32. The carrying rollers 32 are driven by a not shown driving portion controlled by the controller based on a timing when the sheet 11 passes the sheet sensor 31, and start carrying the sheet 11. Generally, the timing when the carrying rollers 32 start rotating is delayed after the sheet 11 passes the sheet sensor 31, so that the sheet 11 is pushed against a nip portion between the carrying rollers 32. With such an operation, the skewing of the sheet 11 is corrected.

The sheet 11 carried by the carrying rollers 32 passes a sheet sensor 33 and is carried to another pair of carrying rollers 34. The carrying rollers 34 are driven by a not shown driving portion controlled by the controller at a timing when the sheet 11 passes the sheet sensor 33, and carry the sheet 11 without stopping the sheet 11. The sheet 11 carried by the carrying rollers 34 passes a writing sensor 35, and is carried to an image forming portion 40.

The image forming portion 40 includes four toner image forming portions 41 arranged on a line, and four transfer portions 50 that transfer the toner images formed by the toner image forming portions 41 to the upper surface of the sheet 11 by means of Coulomb force. Each toner image forming portion 41 includes an OPC (Organic Photo Conductor) drum 42 that bears the toner image, a charging roller 45 that charges the surface of the OPC drum 42, an LED (Light Emitting Diode) head 43 composed of LED array that forms a latent image on the charged surface of the OPC drum 42, a developing roller 44 that develops the latent image to form the toner image by means of frictional electrification, and a toner supply portion 46 that supplies the toner to the developing roller 44. In FIG. 1, three of the four image forming portions 41 are represented by the OPC drums 42 thereof.

The transfer portion 50 includes a transfer belt 51 (i.e., an endless belt) that absorbs the sheet 11 by static electricity. The transfer portion 50 further includes a drive roller 52 rotated by a not shown driving portion to move the transfer belt 51, and an idle roller 53 that constitute a pair of rollers with the drive roller 52 around which the transfer belt 51 is stretched. The transfer portion 50 further includes transfer rollers 54 disposed in opposition to the toner image forming portions 41, and are pushed against the OPC drums 42. Voltages are applied to the transfer rollers 54 so that the toner images are transferred from the OPC drums 42 to the sheet 11. The transfer portion 50 further includes a cleaning blade 55 that cleans the transfer belt 51 by scraping the toner from the surface of the transfer belt 51, and a toner box 56 that stores the toner scraped from the transfer belt 51 by the cleaning blade 55.

The toner image forming portions 41 and the transfer belt 51 are driven in synchronization with each other, and the toner images are transferred sequentially to the sheet 11 absorbed by the transfer belt 51 by means of static electricity. The sheet 11 on which the toner image has been transferred by the image forming portion 40 is fed to a fixing portion 90 for fixing the toner image to the sheet 11 by means of heat and pressure.

The fixing portion 90 includes an upper roller 91 and a lower roller 92 each of which has a halogen lamp 93 as an internal heat source and a surface layer made of a resilient material. The upper roller 91 and the lower roller 92 apply heat and pressure to the toner image on the sheet 11 fed from the image forming portion 40, so that the toner is molten and is fixed to the sheet 11. After the toner image is fixed to the sheet 11, the sheet 11 is ejected by eject rollers 94 to a stacker 95 outside the image forming apparatus.

Next, the basic configuration of the belt drive device of the above described transfer portion 50 will be described.

Figure 2:
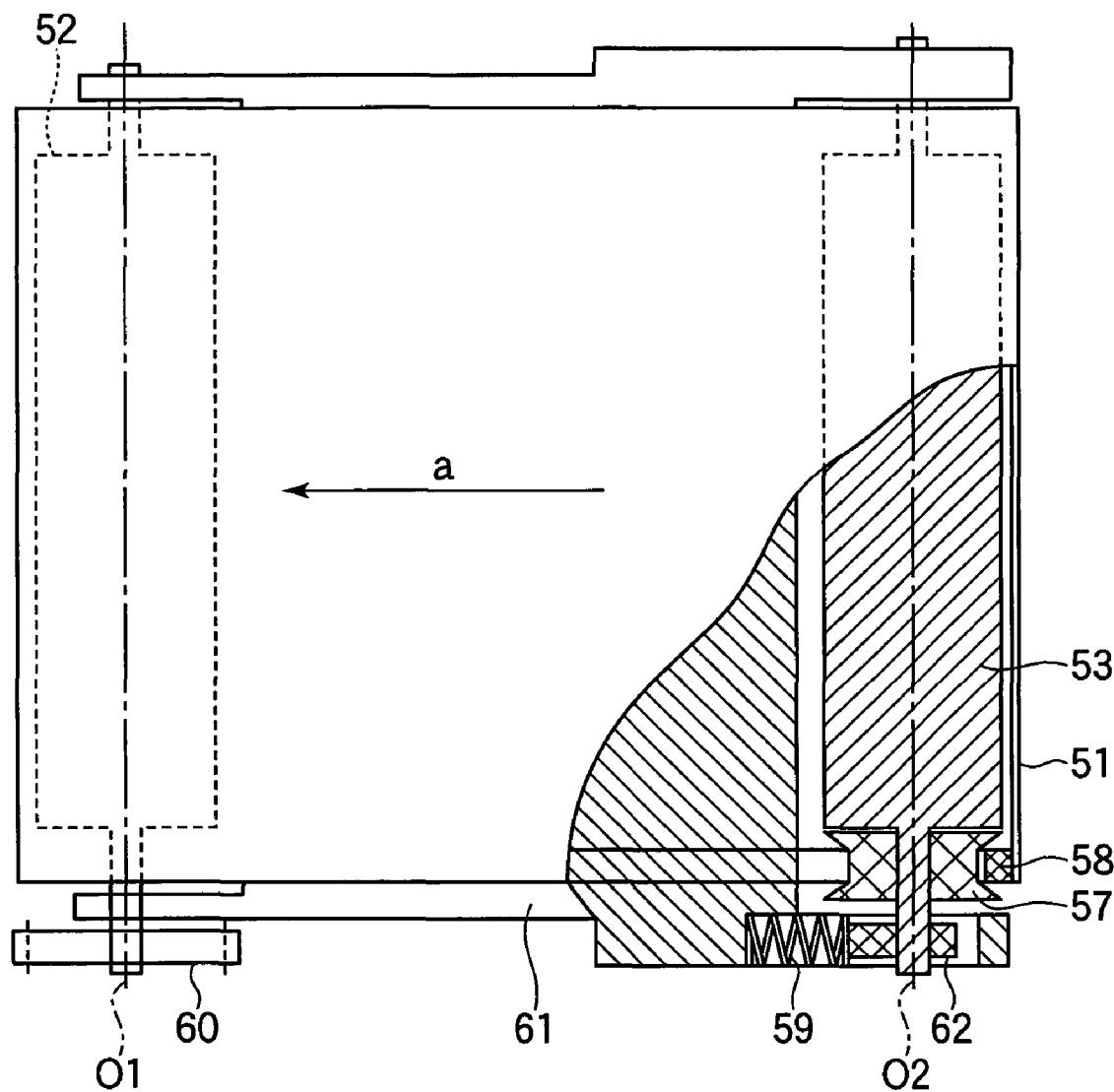
FIG. 2 is a plan view showing a basic configuration of a belt drive device according to the first embodiment of the present invention.

FIG. 2 is a plan view of the basic configuration of the belt drive device according to the first embodiment of the present invention. FIG. 3 is a side view of the basic configuration of the belt drive device according to the first embodiment of the present invention. FIGS. 4A and 4B are a plan view and a side view illustrating the skewing of the transfer belt according to the first embodiment of the present invention.

As shown in FIGS. 2 and 3, the belt drive device of the transfer portion 50 (FIG. 1) includes the drive roller 52 which has a surface of high friction and a gear 60 fixed to an end thereof, the idle roller 53 whose ends are rotatably supported via bearings 62, a belt frame 61 that supports the drive roller 52 and the idle roller 53, or the like. The bearings 62 are slidably held in holes 61a of the belt frame 61, and are pushed by springs 59 so that the transfer belt 51 is stretched. The drive roller 52 is rotated by the not shown driving portion so that the transfer belt 51 moves in the direction a (i.e., the direction indicated by a mark "a").

A pulley 57 is coaxially provided on an end of a shaft of the idle roller 53 so that the pulley 57 is rotatable about the shaft and slidable along the shaft in the axial direction of the idle roller 53. A bead 58 (i.e., a skewing prevention member) is fixed to an inner circumference of the transfer belt 51. The bead 58 engages a groove formed on an outer circumference of the pulley 57, and limits the movement of the transfer belt 51 in the direction perpendicular to the direction a (referred to as skewing), so as to prevent the transfer belt 51 from being dropped out of the pulley 57.

The transfer belt 51 is composed of a resin having resiliency such as polyimide, urethane or the like, and is formed by centrifugal molding. The bead 58 is composed of urethane rubber or the like, and is attached to the transfer belt 51 by means of double-sided adhesive tape, adhesive agent or the like. These materials of the transfer belt 51 and the bead 58 are described only as examples, and it is possible to use other materials.

While the transfer belt 51 is moving, depending on a parallelism between the drive roller 52 and the idle roller 53, the idle roller 53 may be in a twisted position with respect to the drive roller 52. In an example shown in FIGS. 4A and 4B, the right end of the idle roller 53 shifts upward. In this case, since the transfer belt 51 moves in the direction perpendicular to the axis of the roller around which the transfer belt 51 is wound, the transfer belt 51 moves along a moving path indicated by a line P in FIG. 4A. A solid-line part of the line P indicates the moving path on the upper side of the drive roller 52 and the idle roller 53, and a dashed-line part of the line P indicates the moving path on the lower side of the drive roller 52 and the idle roller 53. One rotation of the drive roller 52 causes the transfer belt 51 to move an amount indicated by M in the direction indicated by an arrow b (to the left in FIG. 4A).

In another example shown in FIGS. 5A and 5B, the right end of the idle roller 53 shifts downward. In this case, the transfer belt 51 moves along the moving path as shown by a line P in FIG. 5A. One rotation of the drive roller 52 causes the transfer belt 51 to move an amount indicated by M in the direction indicated by an arrow c (to the right in FIG. 5A) which is opposite to the direction b shown in FIG. 4A. As shown in FIGS. 4A through 5B, the skewing of the transfer belt 51 occurs in proportion to the twisted amount of the position of the idle roller 53 with respect to the drive roller 52.

As described above, when the transfer belt 51 starts skewing, the bead 58 moves in contact with the groove of the pulley 57 to limit the skewing of the transfer belt 51.

The configuration of the belt drive device will be described in detail.

Figure 6:
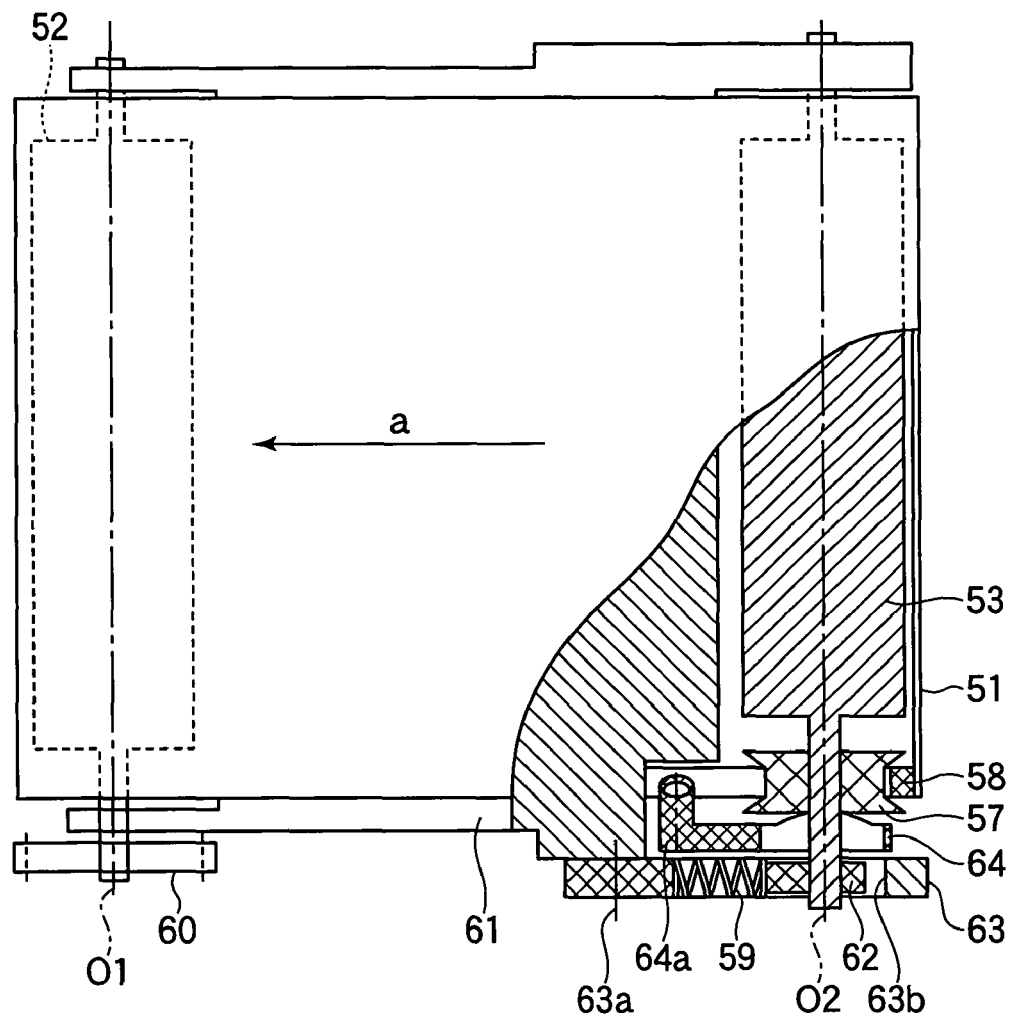
FIG. 6 is a plan view showing a detailed configuration of the belt drive device according to the first embodiment of the present invention.
Figure 7:
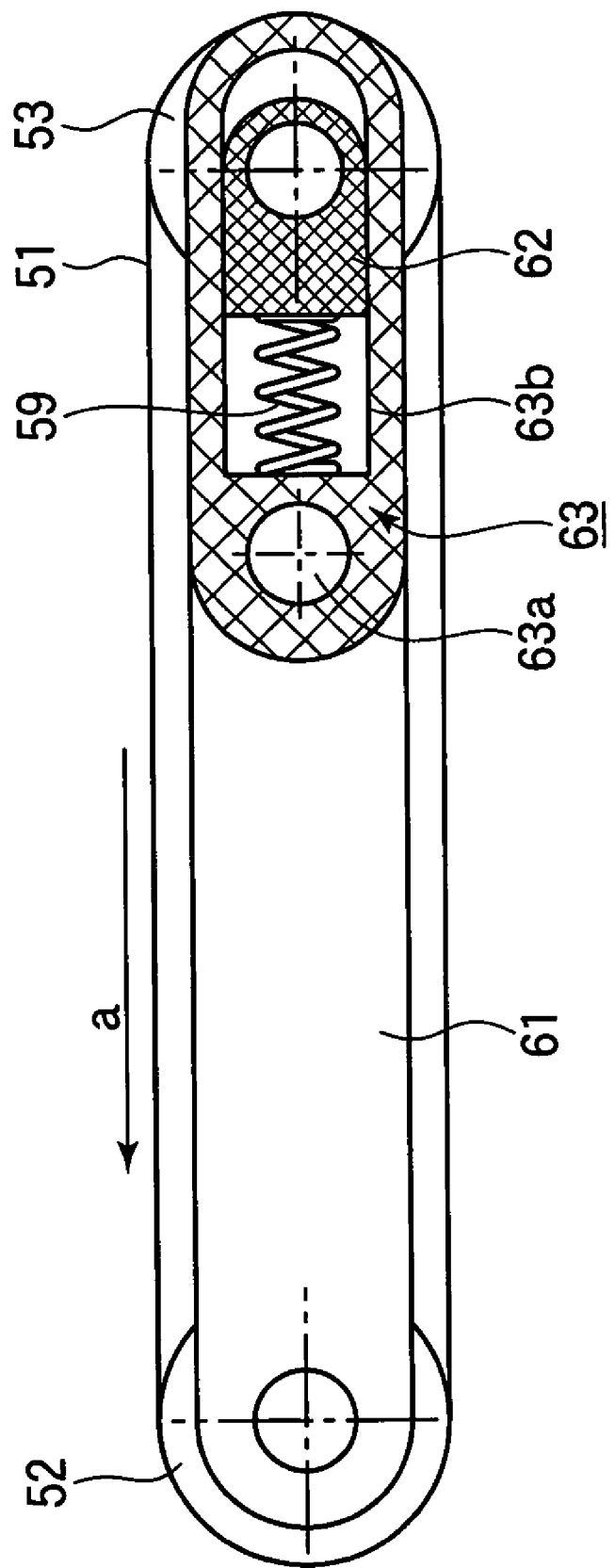
FIG. 7 is a side view of the belt drive device according to the first embodiment of the present invention.

FIGS. 6 and 7 are a plan view and a side view showing the detailed configuration of the belt drive device according to the first embodiment of the present invention.

As shown in FIGS. 6 and 7, in the belt drive device according to the first embodiment of the present invention, the pulley 57 having the groove on the circumference thereof is coaxially provided on an end of the shaft of the idle roller 53. The pulley 57 is rotatable about the shaft of the idle roller 53 and slidable along the shaft in the axial direction of the idle roller 53. The pulley 57 acts as an axial movement detection member. The bead 58 is a band-shaped resilient member provided on the inner circumference of the transfer belt 51 so that the bead 58 engages the groove formed on the outer circumference of the pulley 57.

An arm 63 (i.e., a roller-shaft supporting member) is provided on the belt frame 61 on the same side as the pulley 57. The arm 63 is rotatably supported by the rotation shaft 63a provided on the belt frame 61. The arm 63 has a hole 63b in which the bearing 62 is supported so that the bearing 62 is movable toward and away from the drive roller 52. The bearing 62 rotatably supports the idle roller 53. The bearing 62 is pushed by the spring 59 in the direction in which the transfer belt 51 is stretched (i.e., a tension is applied to the transfer belt 51).

One of the above described holes 61a (FIGS. 3 and 4) corresponds to the hole 63b of the arm 63 shown in FIG. 6, and the other of the holes 61a is formed on the belt frame 61 as described with reference to FIGS. 3 and 4. Thus, one end (i.e., the same end as the pulley 57) of the idle roller 53 is shiftable about the rotation shaft 63a of the arm 63, and the other end of the idle roller 53 is not shiftable. Therefore, the end of the shaft of the idle roller 53 on the same end as the pulley 57 is referred to as a "shiftable end".

A roller tilting lever 64 (i.e., a roller-shaft shifting member) is disposed between the arm 63 and the pulley 57. The roller tilting lever 64 has a rotation axis 64a tilted with respect to the rotation shaft O1 of the drive roller 52.

Figure 8A:
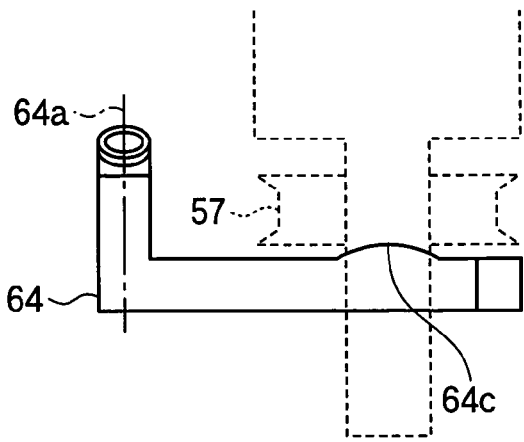
FIGS. 8A, 8B and 8C are respectively a plan view, a side view and a front view of a roller tilting lever according to the first embodiment of the present invention.
Figure 8B:
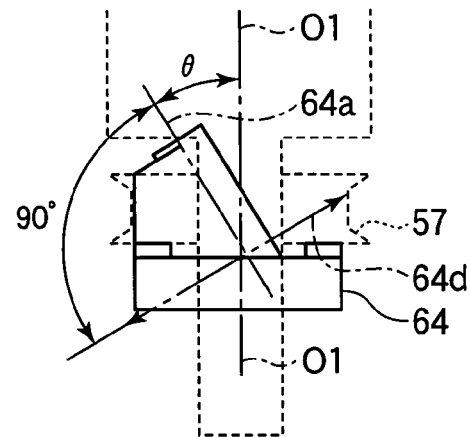
Figure 8C:
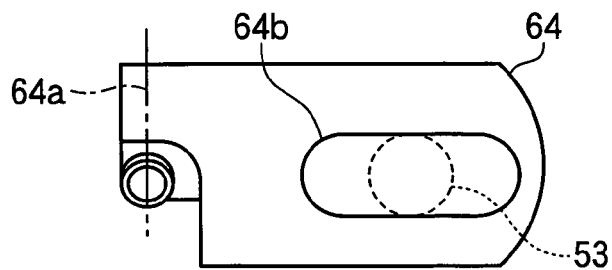
Figure 9:
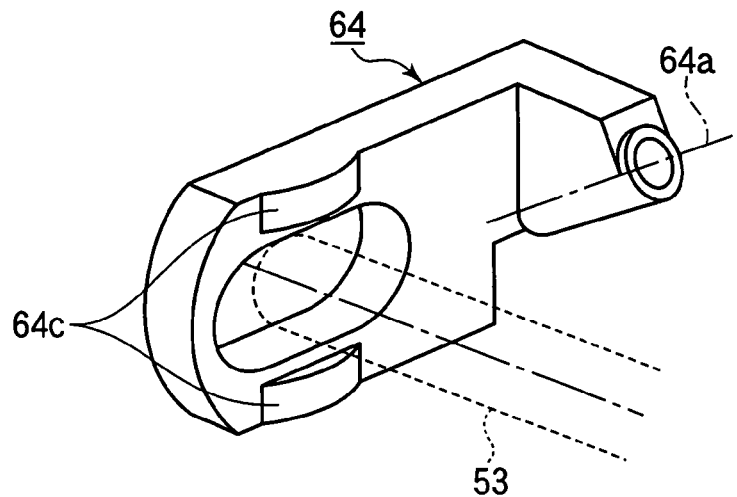
FIG. 9 is a perspective view of the roller tilting lever according to the first embodiment of the present invention.
Figure 10:
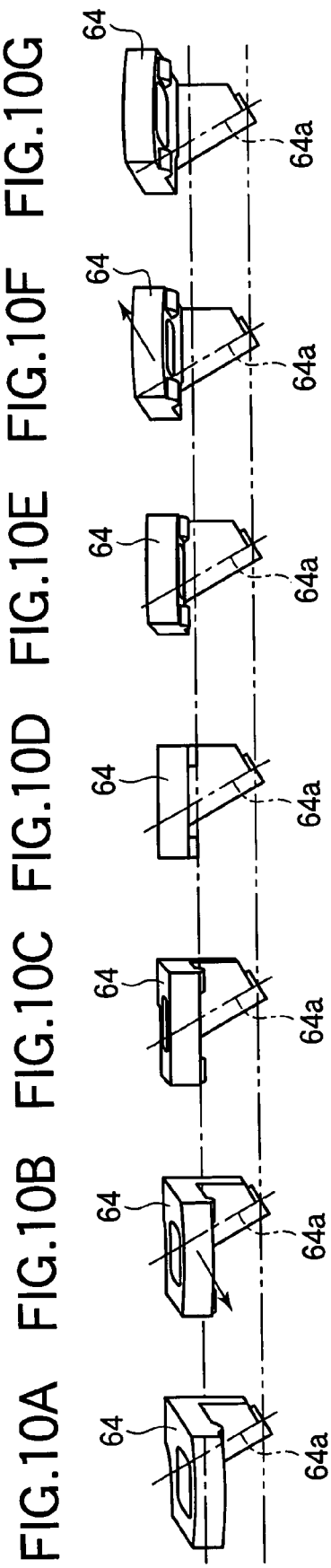
FIGS. 10A through 10G are perspective views illustrating the operation of the roller tilting lever according to the first embodiment of the present invention.

Next, the roller tilting lever 64 will be described. FIGS. 8A, 8B and 8C are respectively a plan view, a side view and a front view of the roller tilting lever 64 according to the first embodiment of the present invention. FIG. 9 is a perspective view of the roller tilting lever 64 according to the first embodiment of the present invention. FIGS. 10A through 10G are perspective views showing the operation of the roller tilting lever 64 according to the first embodiment of the present invention.

As shown in FIG. 8B, the roller tilting lever 64 has a rotation axis 64a tilted with respect to the rotation axis O1 of the drive roller 52 by an angle θ. The roller tilting lever 64 has an elliptical hole 64b. As shown in FIGS. 8A through 9, the shaft of the idle roller 53 penetrates the elliptical hole 64b so that the shaft is rotatable and slidable in the elliptical hole 64b. The roller tilting lever 64 has convex portions 64c that contact the pulley 57.

Since the roller tilting lever 64 has a tilted rotating axis 64a, the roller tilting lever 64 rotates along a path 64d shown in FIG. 8B. Therefore, when the shiftable end (i.e., the same end as the pulley 57) of the idle roller 53 shifts downward, the roller tilting lever 64 rotates to shift downward and close to the idle roller 53. In this state, the roller tilting lever 64 pushes the pulley 57 inwardly, i.e., toward the center of the idle roller 53. When the shiftable end of the idle roller 53 shifts upward, the roller tilting lever 64 rotates to shift upward and away from the idle roller 53. In this state, the roller tilting lever 64 does not push the pulley 57 inwardly. As the roller tilting lever 64 rotates about the rotation axis 64a, the orientation of the roller tilting lever 64 continuously changes as shown in FIGS. 10A through 10G.

The operation of the above configured belt drive device will be described.

Figure 11:
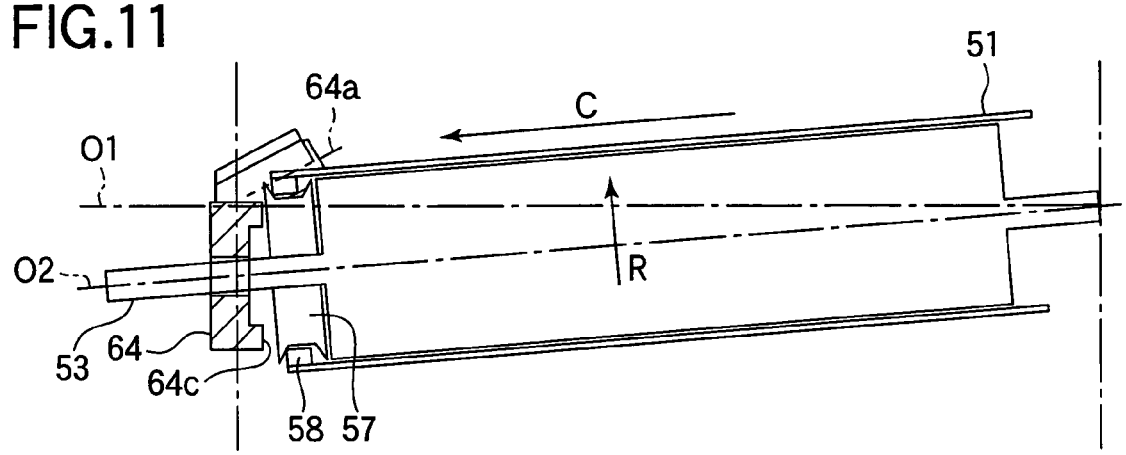
FIG. 11 is a sectional view showing a first state of the operation of the belt drive device according to the first embodiment of the present invention.
Figure 12:
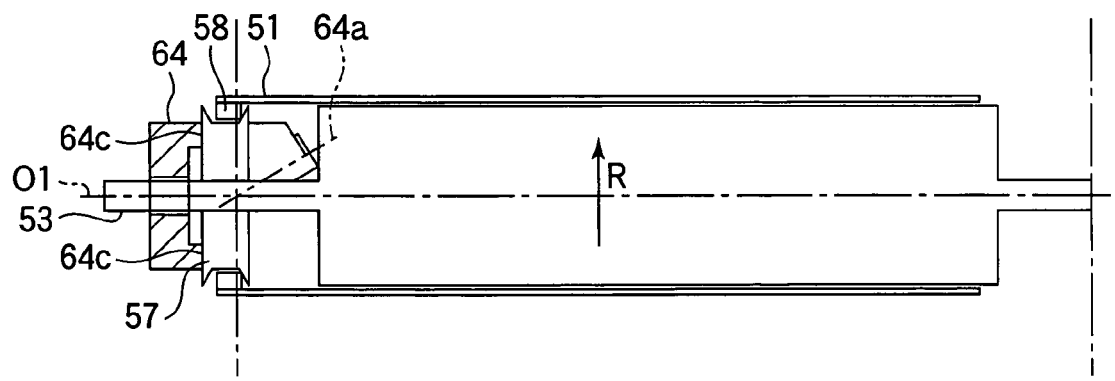
FIG. 12 is a sectional view showing a second state the operation of the belt drive device according to the first embodiment of the present invention.
Figure 13:
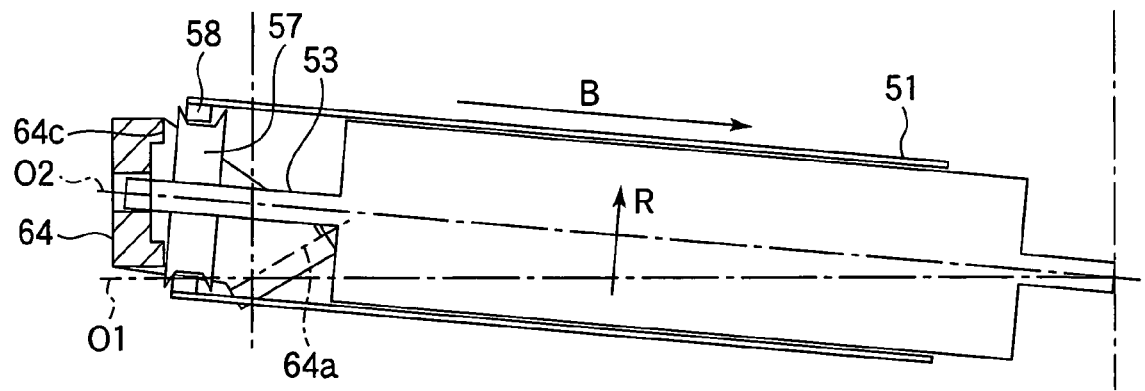
FIG. 13 is a sectional view showing a third state of the operation of the belt drive device according to the first embodiment of the present invention.

FIGS. 11, 12 and 13 are sectional views showing first, second and third states of the operation of the belt drive device according to the first embodiment of the present invention.

First, as shown in FIG. 11, when the transfer belt 51 shifts to the right, the pulley 57 also shifts to the right because the pulley 57 engages the bead 58 of the transfer belt 51. Due to the weight of the idle roller 53, the roller tilting lever 64 rotates about the rotation axis 64a to shift downward and close to the idle roller 53. Therefore, the idle roller 53 is so tilted that the shiftable end of the idle roller 53 shifts downward as shown in FIG. 11.

When the drive roller 52 (FIG. 6) starts rotating (in the direction of an arrow R) and the transfer belt 51 starts moving, the transfer belt 51 is skewed in the direction of an arrow C (i.e., to the left) shown in FIG. 11. In this state, the pulley 57 is pushed by the bead 58 and moves in the direction of the arrow C (i.e., to the left).

Since the roller tilting lever 64 contacts the pulley 57 at the convex portion 64c, the roller tilting lever 64 (pushed by the pulley 57) rotates about the tilted rotation axis 64a. As a result, the roller tilting lever 64 reaches the position shown in FIG. 12. In a position shown in FIG. 12, the rotation axis O2 of the idle roller 53 and the rotation axis O1 of the drive roller 52 (FIG. 6) are almost parallel to each other. Therefore, the skewing of the transfer belt 51 is reduced, and the transfer belt 51 stably moves.

In contrast, when the transfer belt 51 shifts to the left, the pulley 57 also shifts to the left. The roller tilting lever 64 is pushed by the pulley 57 to the left, and therefore the roller tilting lever 64 rotates about the rotation axis 64a to shift upward. With the rotation of the roller tilting lever 64, the idle roller 53 is so tilted that the shiftable end of the idle roller 53 shifts upward as shown in FIG. 13.

In a state where the idle roller 53 is tilted as shown in FIG. 13 (so that the shiftable end shifts upward), the transfer belt 51 is skewed in the direction of an arrow B (to the right in FIG. 13). In this state, the pulley 57 is pushed by the bead 58 and moves in the direction of the arrow B. Due to the weight of the idle roller 53, the roller tilting lever 64 rotates about the rotation axis 64a to shift downward and close to the idle roller 53 so that the convex portion 54c of the roller tilting lever 64 contacts the pulley 57. As a result, the idle roller 53 reaches the position shown in FIG. 12 in which the transfer belt 51 stably moves.

In the above description, the operation from the state shown in FIG. 11 to the state shown in FIG. 12, and the operation from the state shown in FIG. 13 to the state shown in FIG. 12 are described. However, irrespective of the direction in which the idle roller 53 is tilted, the roller tilting lever 64 causes the idle roller 53 to be tilted so as to reduce and cancel the skewing of the transfer belt 51. Therefore, in an assembling process of the belt drive device, it is not necessary to dispose the transfer belt 51 and the idle roller 53 precisely at predetermined positions. By starting the movement of the transfer belt 51, the idle roller 53 is so tilted as to reduce and cancel the skewing of the transfer belt 51 by itself. Thus, it is ensured that the transfer belt 51 stably moves.

As described above, in the first embodiment of the present invention, the roller tilting lever 64 (having the rotation axis 64a tilted with respect to the rotation axis O1 of the drive roller 52) causes the idle roller 53 to be tilted according to the direction of the skewing of the transfer belt 51, and therefore it is ensured that the skewing of the transfer belt 51 is corrected and prevented. Since the skewing of the transfer belt 51 is prevented, the friction between the pulley 57 and the bead 58 can be reduced, so that the wearing of the bead 58 can be reduced. As a result, it becomes possible to prevent the bead 58 from moving out of the groove of the pulley 57 and to thereby prevent the transfer belt 51 from being dropped out of the pulley 57.

Second Embodiment

Next, the second embodiment of the present invention will be described. The components that are the same as those of the first embodiment are assigned the same reference numerals, and duplicate description is omitted. Further, regarding the operation and the effect that are the same as those of the first embodiment, duplicate description is omitted.

Figure 14:
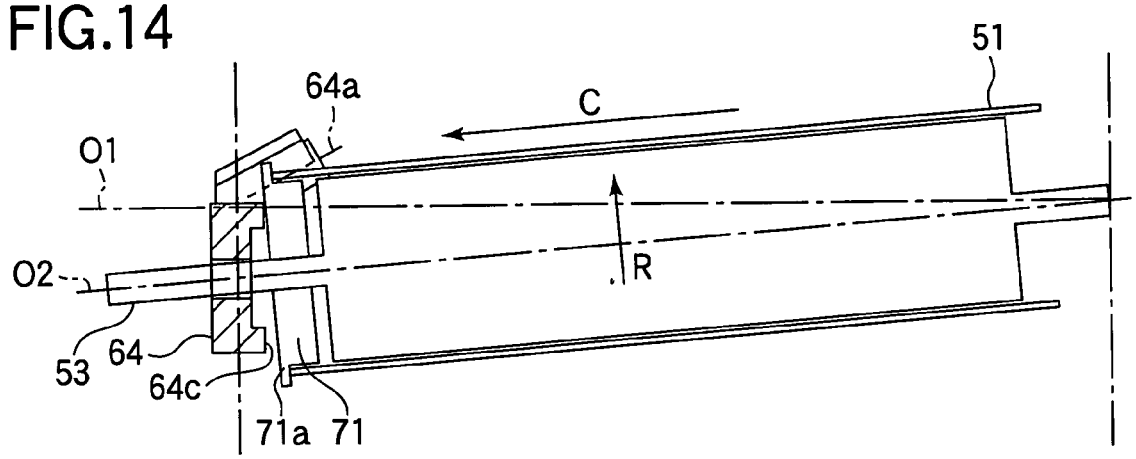
FIG. 14 is a sectional view showing a first state of the operation of a belt drive device according to the second embodiment of the present invention.
Figure 15:
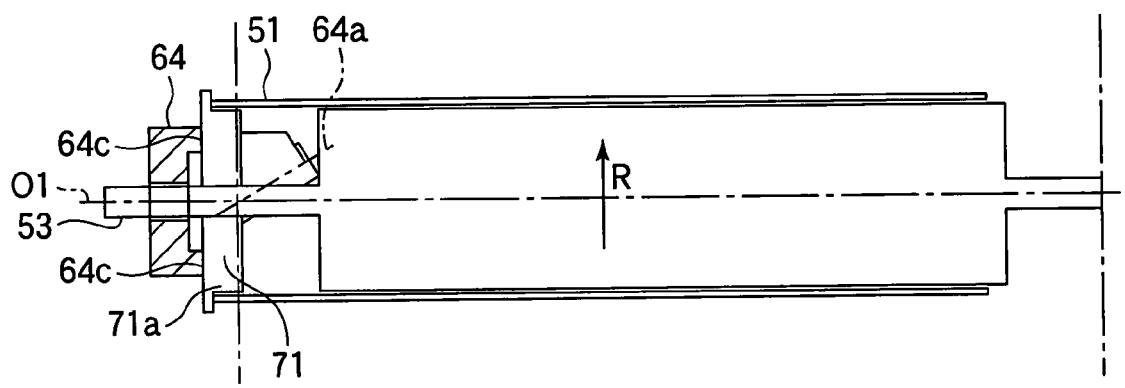
FIG. 15 is a sectional view showing a second state of the operation of the belt drive device according to the second embodiment of the present invention.
Figure 16:
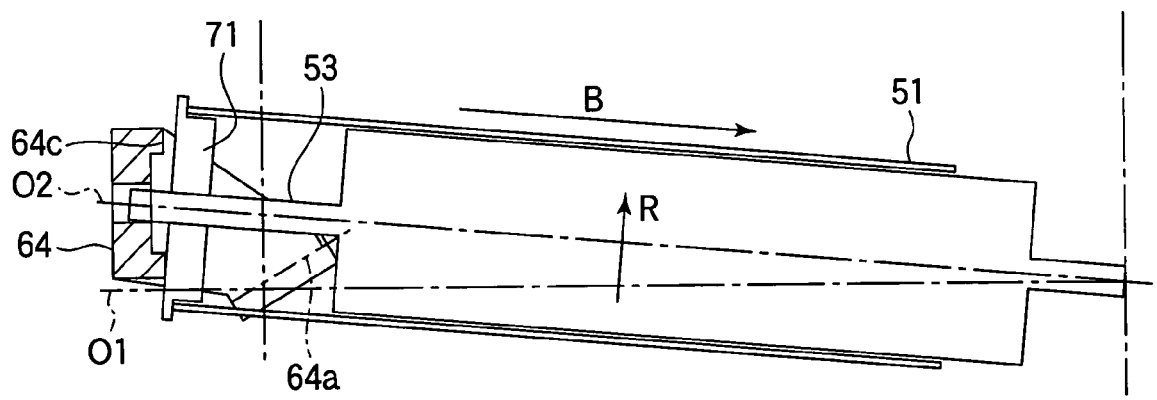
FIG. 16 is a sectional view showing a third state of the operation of a belt drive device according to the second embodiment of the present invention.

FIGS. 14, 15 and 16 are sectional views showing first, second and third states of the operation of the belt drive device according to the second embodiment of the present invention.

In the second embodiment, the bead 58 (fixed to the transfer belt 51 in the first embodiment) is not provided. Further, a pulley 71 of the second embodiment has no groove which engages the bead 58, but has a flange portion 71a which contacts the lateral end of the transfer belt 51.

The operation of the belt drive device according to the second embodiment will be described.

As shown in FIG. 14, when the transfer belt 51 shifts to the right as was described in the first embodiment, the pulley 71 also shifts to the right so that the pulley 71 contacts the lateral end of the transfer belt 51. In this state, the roller tilting lever 64 rotates about the rotation axis 64a to shift downward and closer to the idle roller 53. Therefore, the idle roller 53 is tilted as shown in FIG. 14 so the shiftable end of the idle roller 53 shifts downward.

When the drive roller 52 (FIG. 6) starts rotating and the transfer belt 51 starts moving, the transfer belt 51 is skewed as shown in the direction C (i.e., to the left) shown in FIG. 14. In this state, the pulley 71 is pushed by the transfer belt 51 and moves in the direction C (i.e., to the left).

Since the roller tilting lever 64 contacts the pulley 71 at the convex portion 64c, the roller tilting lever 64 is pushed by the pulley 71 and rotates about the rotation axis 64a to shift upward. As a result, the roller tilting lever 64 reaches a position shown in FIG. 15. In a position shown in FIG. 15, the rotation axis O2 of the idle roller 53 is almost parallel to the rotation axis O1 of the drive roller 52. Therefore, the skewing of the transfer belt 51 is reduced, and the transfer belt 51 stably moves.

In a state where the idle roller 53 is tilted as shown in FIG. 16 (so that the shiftable end shifts upward), the transfer belt 51 is skewed in the direction B (i.e., to the right) shown in FIG. 16 so that a gap may be formed between the pulley 71 and the transfer belt 51. However, due to the weight of the idle roller 53, the roller tilting lever 64 rotates to shift downward and close to the idle roller 53 so that the convex portion 64c contacts the pulley 71 and the pulley 71 contacts the lateral end of the transfer belt 51. As a result, the roller tilting lever 64 reaches the position shown in FIG. 15, in which the transfer belt 51 stably moves.

In the above description, the operation from the state shown in FIG. 14 to the state shown in FIG. 15, and the operation from the state shown in FIG. 16 to the state shown in FIG. 15 are described. However, irrespective of the direction in which the idle roller 53 is tilted, the roller tilting lever 64 causes the idle roller 53 to be tilted so as to reduce and cancel the skewing of the transfer belt 51. Therefore, in the assembling process of the belt drive device, it is not necessary to dispose the transfer belt 51 and the idle roller 53 precisely at predetermined positions. By starting the movement of the transfer belt 51, the idle roller 53 is so tilted as to reduce the skewing of the transfer belt 51 by itself. Thus, it is ensured that the transfer belt 51 stably moves.

In the second embodiment, since the bead 58 is not provided on the transfer belt 51, it is possible to solve the problem that the worn bead 58 moves out of the groove of the pulley 71.

As described above, in the second embodiment, the roller tilting lever 64 (having the rotation axis tilted with respect to the rotation axis O1 of the drive roller 52) causes the idle roller 53 to be tilted according to the direction of the skewing of the transfer belt 51, and therefore it is ensured that the skewing of the transfer belt 51 is corrected and prevented.

Moreover, since the bead 58 is not provided on the transfer belt 51, it is possible to solve the problem that the worn bead 58 moves out of the groove of the pulley 71. Further, the manufacturing cost can be reduced.

Third Embodiment

Next, the third embodiment of the present invention will be described. The components that are the same as those of the first and second embodiments are assigned the same reference numerals, and duplicate description is omitted. Further, regarding the operation and effect that are the same as those of the first and second embodiments, duplicate description is omitted.

Figure 17:
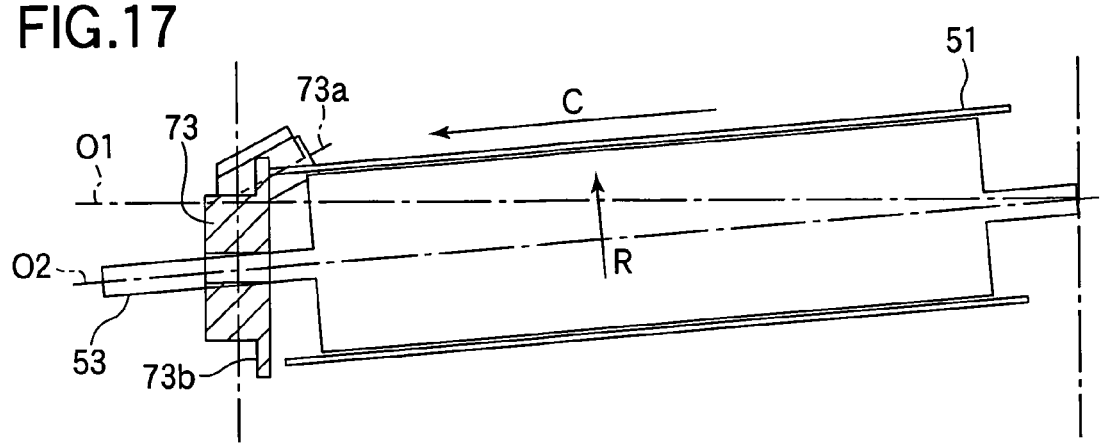
FIG. 17 is a sectional view showing a first state of the operation of a belt drive device according to the third embodiment of the present invention.
Figure 18:
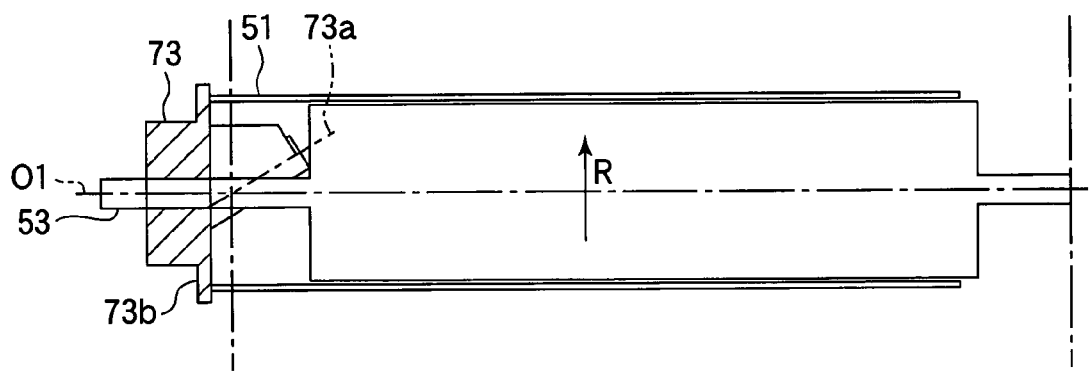
FIG. 18 is a sectional view showing a second state of the operation of the belt drive device according to the third embodiment of the present invention.
Figure 19:
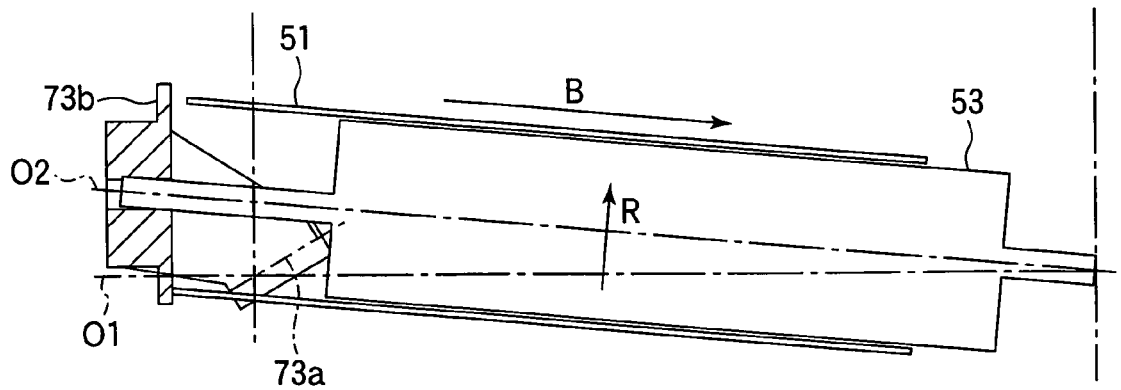
FIG. 19 is a sectional view showing a third state of the operation of the belt drive device according to the third embodiment of the present invention.

FIGS. 17, 18 and 19 are sectional views showing first, second and third states of the operation of the belt drive device according to the third embodiment of the present invention.

In the third embodiment, the pulley 57 and the pulley 71 (as in the first and second embodiments) are not provided. Further, a roller tilting lever 73 of the third embodiment has a flange portion 73b that contacts the lateral end of the transfer belt 51. The roller tilting lever 73 has a rotation axis 73a tilted with respect to the rotation axis O1 of the drive roller 52 (FIG. 6).

The operation of the belt drive device according to the third embodiment will be described.

As shown in FIG. 17, when the transfer belt 51 shifts to the right (as in the first and second embodiments), the pulley 71 also shifts to the right so that the pulley 71 contacts the lateral end of the transfer belt 51. In this state, the roller tilting lever 73 rotates about the rotation axis 73a to shift downward and closer to the idle roller 53. Therefore, the idle roller 53 is tilted as shown in FIG. 17 so that the shiftable end of the idle roller 53 shifts downward.

When the drive roller 52 starts rotating and the transfer belt 51 starts moving, the transfer belt 51 is skewed as shown in the direction C (i.e., to the left) in FIG. 17. In this state, the roller tilting lever 73 is pushed by the transfer belt 51 in the direction C and rotates about the tilted rotation axis 73a to shift upward. As a result, the roller tilting lever 73 reaches a position shown in FIG. 18. In a position shown in FIG. 18, the rotation axis O2 of the idle roller 53 is almost parallel to the rotation axis O1 of the drive roller 52. Therefore, the skewing of the transfer belt 51 is reduced, and the transfer belt 51 stably moves.

In a state where the idle roller 53 is tilted as shown in FIG. 19 (so that the shiftable end shifts upward), the transfer belt 51 is skewed in the direction B (i.e., to the right) in FIG. 19, so that a gap may be formed between the roller tilting lever 73 and the transfer belt 51. However, due to the weight of the idle roller 53, the roller tilting lever 73 rotates about the rotation axis 73a downward and closer to the idle roller 53 so that the flange portion 73b contacts the lateral end of the transfer belt 51. As a result, the transfer belt 51 stably moves as shown in FIG. 18.

In the above description, the operation from the state shown in FIG. 17 to the state shown in FIG. 18, and the operation from the state shown in FIG. 19 to the state shown in FIG. 18 are described. However, irrespective of the direction in which the idle roller 53 is tilted, the roller tilting lever 73 causes the idle roller 53 to be tilted so as to reduce and cancel the skewing of the transfer belt 51. Therefore, in the assembling process of the belt drive device, it is not necessary to dispose the transfer belt 51 and the idle roller 53 precisely at predetermined positions. By starting the movement of the transfer belt 51, the idle roller 53 is so tilted as to reduce the skewing of the transfer belt 51 by itself, so that the transfer belt 51 stably moves.

As described above, in the third embodiment, the roller tilting lever 73 (having the rotation axis 73a tilted with respect to the rotation axis O1 of the drive roller 52) causes the idle roller 53 to be tilted according to the direction of the skewing of the transfer belt 51, and therefore it is ensured that the skewing of the transfer belt 51 is corrected and prevented.

Moreover, since the pulley 57 and the pulley 71 (as in the first and second embodiment) are not provided, it is possible to further reduce the manufacturing cost.

Fourth Embodiment

Next, the fourth embodiment of the present invention will be described. The components that are the same as those of the first through third embodiments are assigned the same reference numerals, and duplicate description is omitted. Further, regarding the operation and effect that are the same as those of the first through third embodiments, duplicate description is omitted.

Figure 20:
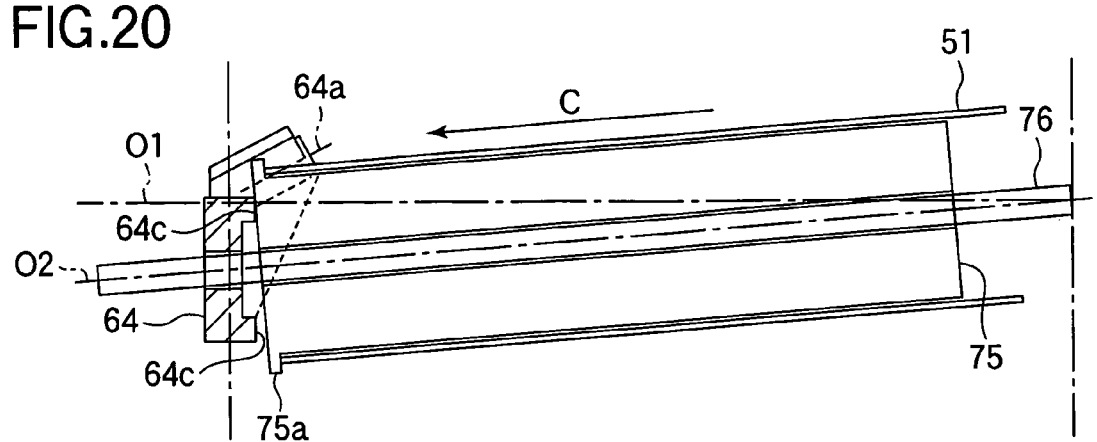
FIG. 20 is a sectional view showing a first state of the operation of a belt drive device according to the fourth embodiment of the present invention.
Figure 21:
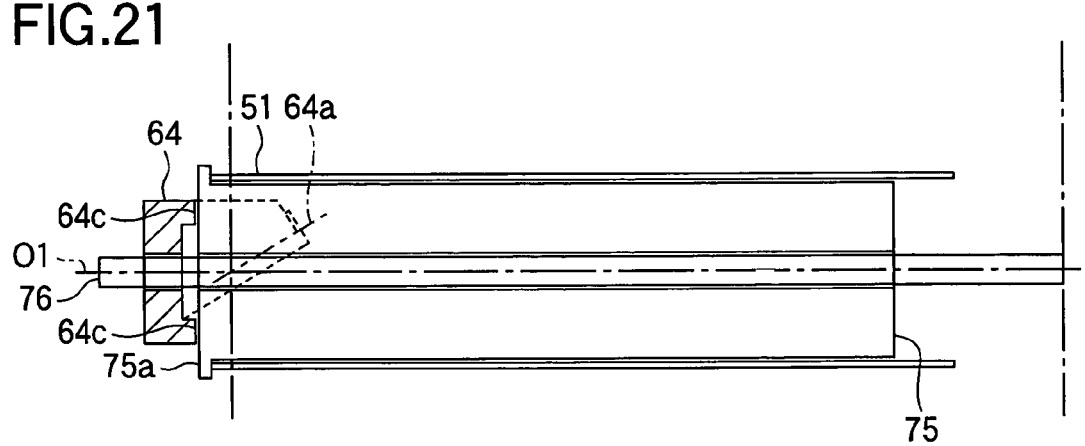
FIG. 21 is a sectional view showing a second state of the operation of the belt drive device according to the fourth embodiment of the present invention.
Figure 22:
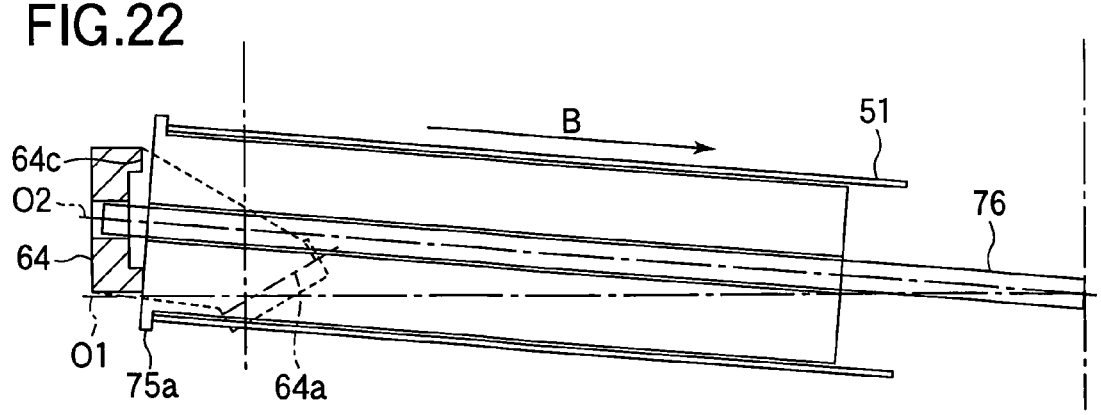
FIG. 22 is a sectional view showing a third state of the operation of the belt drive device according to the fourth embodiment of the present invention.

FIGS. 20, 21 and 22 are sectional views showing first, second and third states of the operation of the belt drive device according to the fourth embodiment of the present invention.

In the fourth embodiment, the pulley 57 and the pulley 71 (as in the first and second embodiments) are not provided. Further, an idle roller 75 of the fourth embodiment has a flange portion 75a on an end thereof, and the flange portion 75a slidably contacts the lateral end of the transfer belt 51. The idle roller 75 is supported by a shaft 76 so that the idle roller 75 is rotatable about the shaft 76 and slidable in the axial direction of the shaft 76. The shaft 76 penetrates the elliptical hole 64b of the roller tilting lever 64 described in the first and second embodiments.

The operation of the belt drive device according to the fourth embodiment will be described.

As shown in FIG. 20, when the transfer belt 51 shifts to the right (as in the first embodiment), the idle roller 75 also shifts to the right so that the flange portion 75a of the idle roller 75 contacts the lateral end of the transfer belt 51. In this state, the roller tilting lever 64 rotates about the rotation axis 64a to shift downward and close to the idle roller 75. Therefore, the idle roller 75 is tilted as shown in FIG. 20 so that the shiftable end of the idle roller 75 shifts downward.

When the drive roller 52 starts rotating and the transfer belt 51 starts moving, the transfer belt 51 is skewed as shown in the direction C (i.e., to the left) shown in FIG. 20. The idle roller 75 is pushed by the transfer belt 51 and moves in the direction C. Since the roller tilting lever 64 contacts the idle roller 75 at the convex portion 64c, the roller tilting lever 64 is pushed by the idle roller 75 and rotates about the tilted rotation axis 64a to shift upward. As a result, the roller tilting lever 64 reaches a position shown in FIG. 21.

In a position shown in FIG. 21, the rotation axis O2 of the idle roller 75 is almost parallel to the rotation axis O1 of the drive roller 52. Therefore, the skewing of the transfer belt 51 is reduced, and the transfer belt 51 stably moves.

In a state where the idle roller 73 is tilted as shown in FIG. 22 (so that the shiftable end shifts upward), the transfer belt 51 is skewed in the direction B (i.e., to the right) shown in FIG. 22 so that a gap may be formed between the flange portion 75a of the idle roller 75 and the transfer belt 51. However, the roller tilting lever 64 is forced downward due to the weight of the idle roller 75 and the shaft 76, and therefore the roller tilting lever 64 rotates about the rotation axis 64a to shift downward and close to the idle roller 76, so that the convex portion 64c contacts the flange portion 75a of the idle roller 75. Thus, the roller tilting lever 64 pushes the idle roller 75 and causes the idle roller 75 to slide along the shaft 76 so that the flange 75a of the idle roller 75 contacts the transfer belt 51. As a result, the roller tilting lever 64 reaches the position shown in FIG. 21, in which the transfer belt 51 stably moves.

In the above description, the operation from the state shown in FIG. 20 to the state shown in FIG. 21, and the operation from the state shown in FIG. 22 to the state shown in FIG. 21 are described. However, irrespective of the direction in which the idle roller 75 is tilted, the roller tilting lever 64 causes the idle roller 75 to be tilted so as to reduce and cancel the skewing of the transfer belt 51. Therefore, in the assembling process of the belt drive device, it is not necessary to dispose the transfer belt 51 and the idle roller 75 precisely at predetermined positions. By starting the movement of the transfer belt 51, the idle roller 75 is so tilted as to reduce the skewing of the transfer belt 51 by itself, so that the transfer belt 51 stably moves.

As described above, in the fourth embodiment, the roller tilting lever 64 (having the rotation axis 64a tilted with respect to the rotation axis O1 of the drive roller 52) causes the idle roller 75 to be tilted according to the direction of the skewing of the transfer belt 51, and therefore it is ensured that the skewing of the transfer belt 51 is corrected and prevented.

Moreover, since the pulley 57 and the pulley 71 (as in the first and second embodiment) are not provided, and since the flange portion 75a is integrally formed with the idle roller 75, it is possible to further reduce the manufacturing cost.

Additionally, in the above described first through third embodiment, there is a possibility that a gap may be formed between the pulley 57 (or the pulley 71) and the idle roller 53. Such a gap may cause transfer belt 51 to be wrinkled, and may influence the movement of the sheets 11 fed by the transfer belt 51. However, according to the fourth embodiment, such a gap between the pulley and the idle roller is not formed, and therefore the sheets 11 are prevented from being wrinkled.

Fifth Embodiment

Next, the fifth embodiment of the present invention will be described. The components that are the same as those of the first through fourth embodiments are assigned the same reference numerals, and duplicate description is omitted. Further, regarding the operation and effect that are the same as those of the first through fourth embodiments, duplicate description is omitted.

Figure 23:
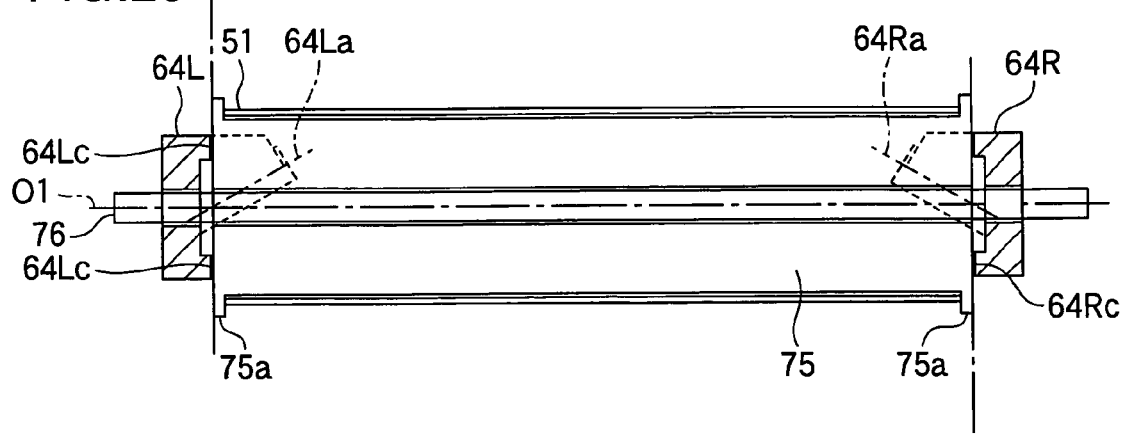
FIG. 23 is a sectional view showing a first state of the operation of a belt drive device according to the fifth embodiment of the present invention.
Figure 24:
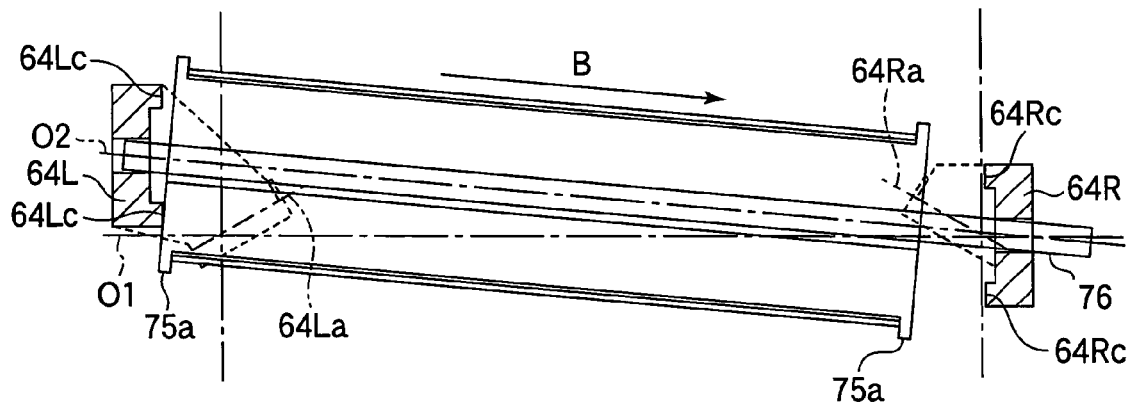
FIG. 24 is a sectional view showing a second state of the operation of the belt drive device according to the fifth embodiment of the present invention.
Figure 25:
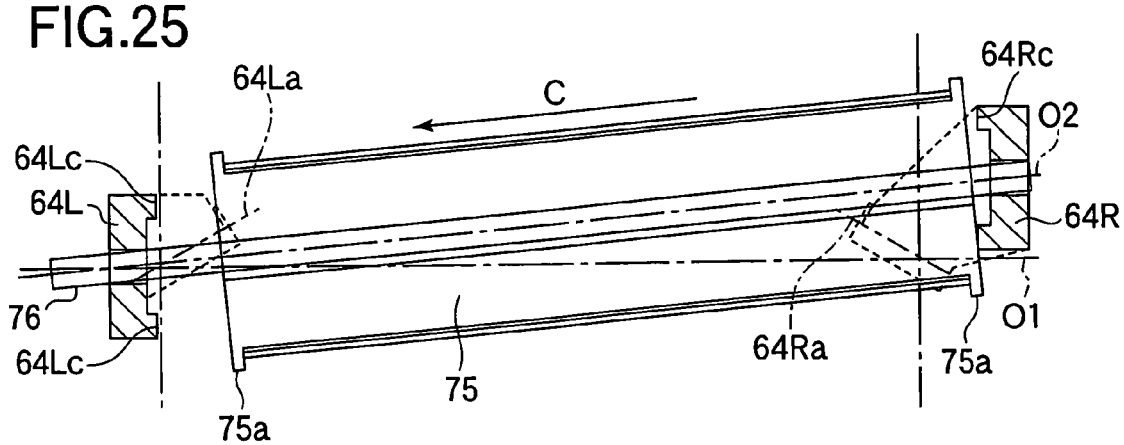
FIG. 25 is a sectional view showing a third state of the operation of the belt drive device according to the fifth embodiment of the present invention.

FIGS. 23, 24 and 25 are sectional views showing first, second and third states of the operation of the belt drive device according to the fifth embodiment of the present invention.

In the fifth embodiment, the pulley 57 and the pulley 71 (as in the first and second embodiments) are not provided. The idle roller 75 is slidably supported by the shaft 76 as in the fourth embodiment. In the fifth embodiment, two flange portions 75a are formed on both ends of the idle roller 75. The transfer belt 51 is disposed between both flange portions 75a.

Moreover, both ends of the shaft 76 are supported by two arms 63 one of which is shown in FIG. 6 so that both ends of the shaft 76 are shiftable about the rotation axes 63a of the arms 63. Additionally, two roller tilting levers 64 are disposed on both ends of the shaft 76. The roller tilting lever 64 disposed on the left side in FIGS. 23 through 25 is denoted by numeral 64L. The roller tilting lever 64 disposed on the right side in FIGS. 23 through 25 is denoted by numeral 64R. The roller tilting levers 64L and 64R respectively have rotation shafts 64La and 64Ra tilted with respect to the rotation axis O1 of the drive roller 52. Further, the roller tilting levers 64L and 64R have convex portions 64Lc and 64Rc contacting the ends of the idle roller 53. The shaft 76 penetrates the elliptical holes 64b of the roller tilting levers 64L and 64R.

The operation of the belt drive device according to the fifth embodiment will be described.

As shown in FIG. 25, when the transfer belt 51 is skewed in the direction C (i.e., to the left), the idle roller 75 is pushed by the transfer belt 51 and shifts to the left. Then, the idle roller 75 pushes the roller tilting lever 64L to the left, and the roller tilting lever 64L rotates about the rotation axis 64La to shift upward. In this state, the idle roller 75 is tilted as shown in FIG. 24 so that the left end of the idle roller 75 shifts upward. In this state, the transfer belt 51 tends to be skewed in the direction B (i.e., to the right) shown in FIG. 24.

When the transfer belt 51 is skewed in the direction B as shown in FIG. 24, the idle roller 75 is pushed by the transfer belt 51 and shifts to the right. Then, the idle roller 75 pushes the roller tilting lever 64R to the right, and the roller tilting lever 64R rotates about the rotation axis 64Ra to shift upward. Therefore, the idle roller 75 is tilted as shown in FIG. 25 so that the right end of the idle roller 75 shifts upward. In this state, the transfer belt 51 tends to be skewed in the direction C (i.e., to the left).

By repeating the above described operations, the idle roller 75 reaches the position shown in FIG. 23. In a position shown in FIG. 23, the rotation axis O2 of the idle roller 75 is almost parallel to the rotation axis O1 of the drive roller 52. Therefore, the skewing of the transfer belt 51 is reduced, and the transfer belt 51 stably moves.

In the above description, the operations between the state shown in FIG. 24 and the state shown in FIG. 25 are described. However, irrespective of the direction in which the idle roller 75 is tilted, the roller tilting levers 64L and 64R cause the idle roller 75 to be tilted so as to reduce and cancel the skewing of the transfer belt 51. Therefore, in the assembling process of the belt drive device, it is not necessary to dispose the transfer belt 51 and the idle roller 75 at predetermined positions. By starting the movement of the transfer belt 51, the idle roller 75 is so tilted as to reduce the skewing of the transfer belt 51 by itself. Thus, it is ensured that the transfer belt 51 stably moves.

Additionally, in the fifth embodiment, the tilt angle of the idle roller 75 is a half of the angle of the idle roller 75 in the above described fourth embodiment. Thus, the change in the moving path of the sheet 11 fed by the transfer belt 51 can be reduced, and the change in the winding angle of the transfer belt 51 around the idle roller 75 can be reduced. As a result, the movement of the transfer belt 51 can be stabilized.

As described above, in the fifth embodiment, the roller tilting levers 64L and 64R (having the rotation axes 64La and 64Ra tilted with respect to the rotation axis O1 of the drive roller 52) are provided on both ends of the idle roller 75, and the roller tilting levers 64L and 64R cause the idle roller 75 to be tilted according to the direction of the skewing of the transfer belt 51. Therefore, it is ensured that the skewing of the transfer belt 51 is corrected and prevented.

Moreover, since the tilt angle of the idle roller 75 is reduced by half, the change in the moving path of the sheet 11 can be reduced, and the change in the winding angle of the transfer belt 51 around the idle roller 75 can be reduced, with the result that the movement of the transfer belt 51 can be stabilized.

Sixth Embodiment

Next, the sixth embodiment of the present invention will be described. The components that are the same as those of the first through fifth embodiments are assigned the same reference numerals, and duplicate description is omitted. Further, regarding the operation and effect that are the same as those of the first through fifth embodiments, duplicate description is omitted.

Figure 26:
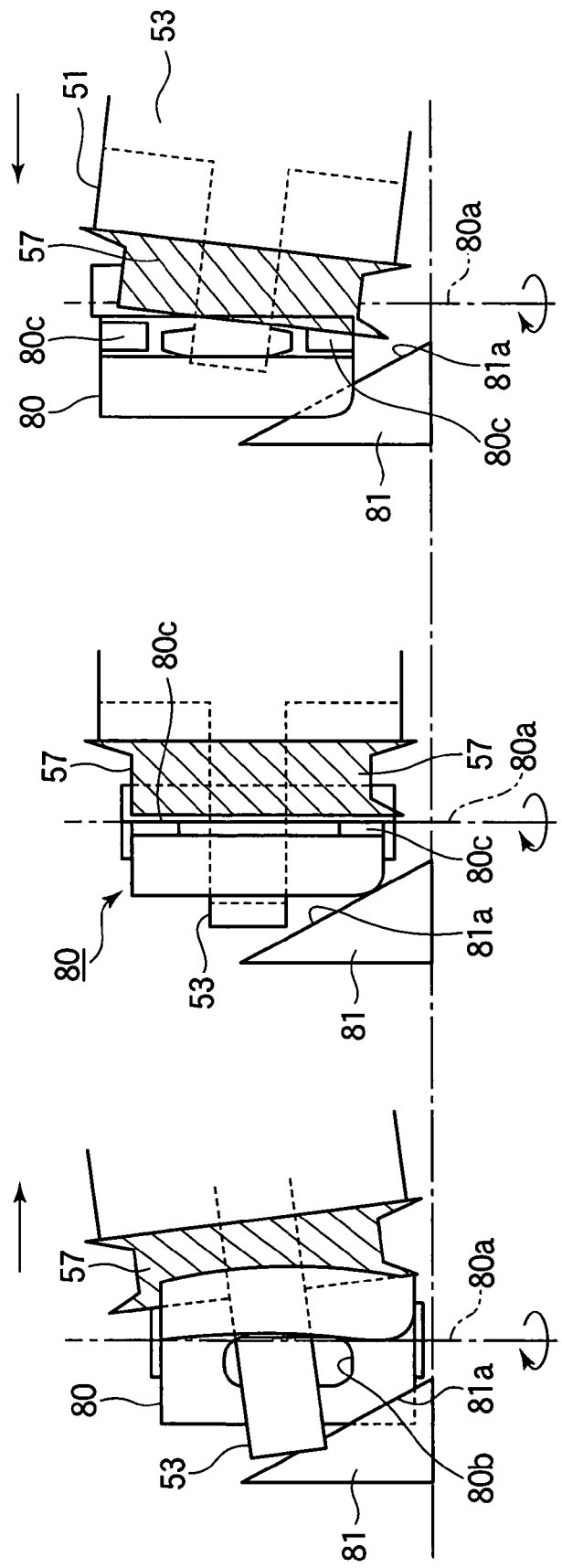
FIGS. 26A, 26B and 26C are sectional views of an end of an idle roller according to the sixth embodiment of the present invention.
Figure 27:
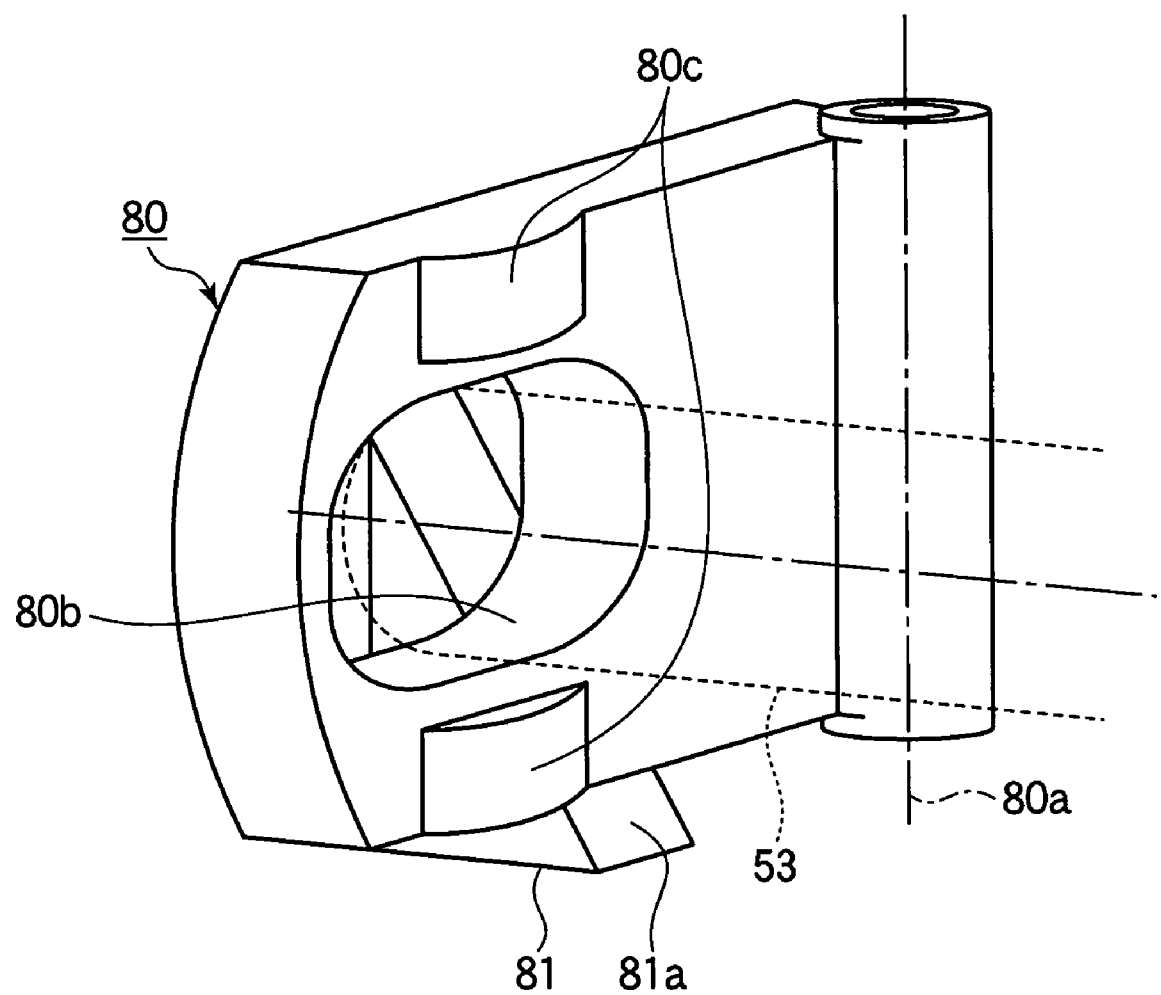
FIG. 27 is a perspective view of a roller tilting lever according to the sixth embodiment of the present invention.

FIGS. 26A, 26B and 26C are sectional views showing first, second and the third states of the end portion of the idle roller according to the sixth embodiment of the present invention. FIG. 27 is a perspective view of the roller tilting lever according to the sixth embodiment of the present invention.

As shown in FIG. 27, a roller tilting lever 80 of the sixth embodiment has a rotation axis 80a perpendicular to the rotation axis O1 of the drive roller 52 (FIG. 6). The belt frame 61 (FIG. 6) has a tilt member 81 having a slope (i.e., a tilted part) 81a that contacts the bottom of the roller tilting lever 80. The roller tilting lever 80 further has convex portions 80c that contact the pulley 57.

The shaft of the idle roller 53 penetrates an elliptical hole 80b formed on the roller tilting lever 80.

The operation of the belt drive device will be described.

As shown in FIGS. 26A through 26C, the roller-tilting lever 80 rotates about the rotation axis 80a, and the bottom of the roller tilting lever 80 contacts the slope 81a of the tilt member 81. In this state, when the roller tilting lever 80 moves to the right as shown in FIG. 26A, the roller tilting lever 80 rotates about the rotation shaft 80a to shift downward along the slope 81a of the tilt member 81, due to the weight of the idle roller 53. When the roller tilting lever 80 moves to the left as shown in FIG. 26C, the roller tilting lever 80 rotates about the rotation axis 80a to shift upward along the slope 81a of the tilt member 81. With such a configuration, the same operation of the roller tilting lever as in the first to fifth embodiments can be accomplished, using the roller tilting lever 80 whose rotation axis 80a is not tilted.

As described above, the belt drive device of the sixth embodiment includes the roller tilting lever 80 having the rotation axis 80a perpendicular to the rotation axis O1 of the drive roller 52, and the tilt member 81 (contacting the roller tilting lever 80) causes the roller tilting lever 80 to move vertically when the roller tilting lever 80 rotates. Therefore, the influence of the degree of accuracy of the rotation axis 80a of the roller tilting lever 80 can be minimized. Further, the mounting space of the roller tilting lever 80 can be reduced.

Seventh Embodiment

Next, the seventh embodiment of the present invention will be described. The components that are the same as those of the first through sixth embodiments are assigned the same reference numerals, and duplicate description is omitted. Further, regarding the operation and effect that are the same as those of the first through sixth embodiments, duplicate description is omitted.

Figure 28:
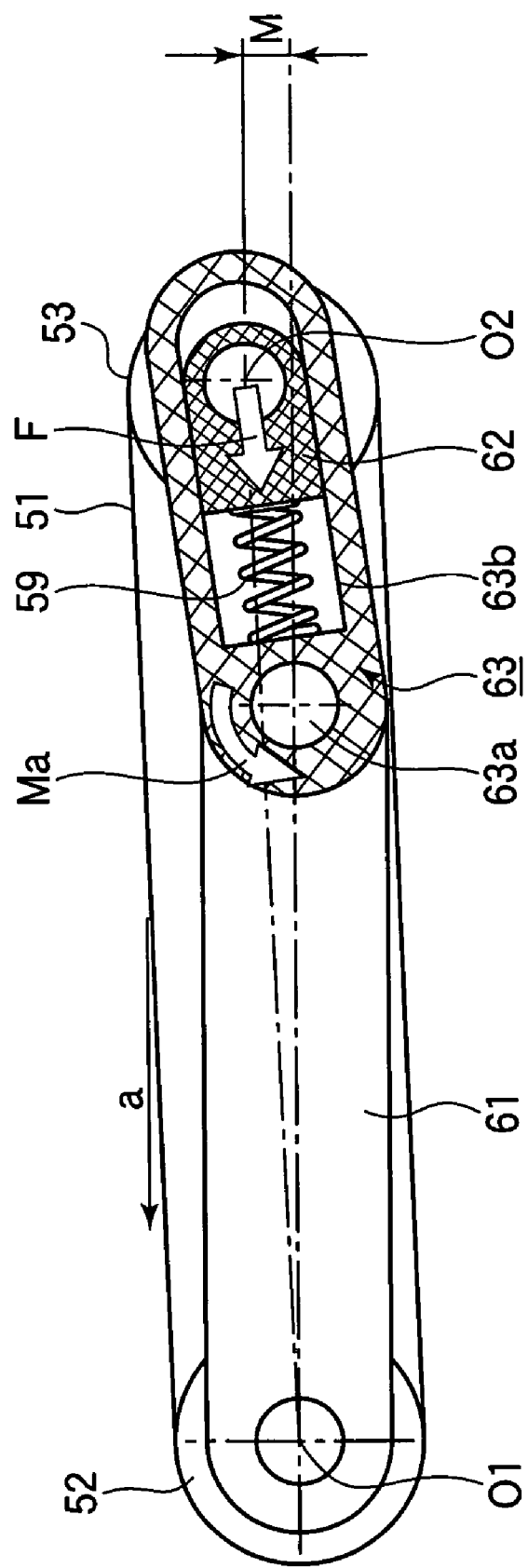
FIG. 28 is a side view showing a first state of the operation of an arm according to the seventh embodiment of the present invention.
Figure 29:
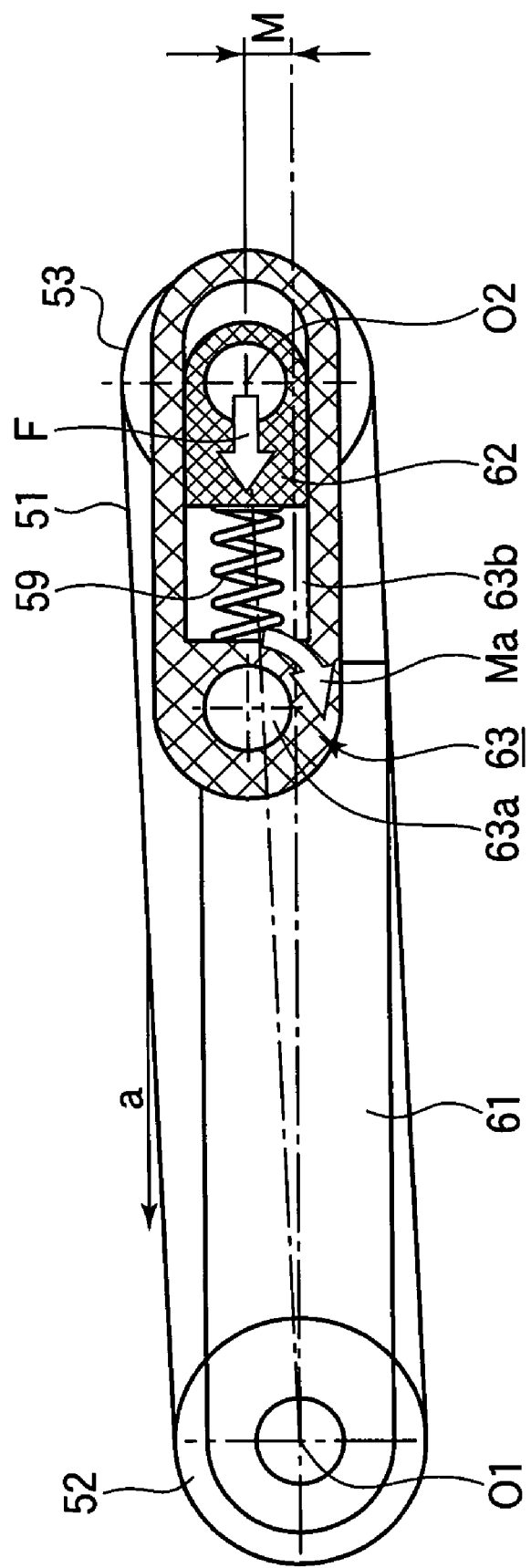
FIG. 29 is a side view showing a second state of the operation of the arm according to the seventh embodiment of the present invention.
Figure 30:
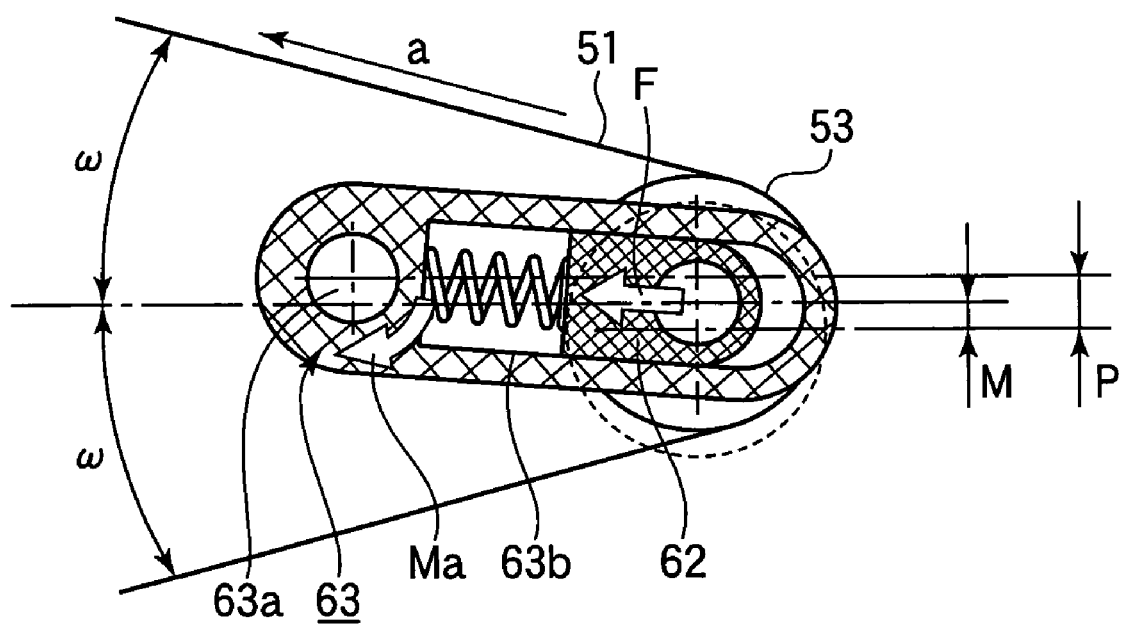
FIG. 30 is a partial view showing a third state of the operation of the arm according to the seventh embodiment of the present invention.
Figure 31:
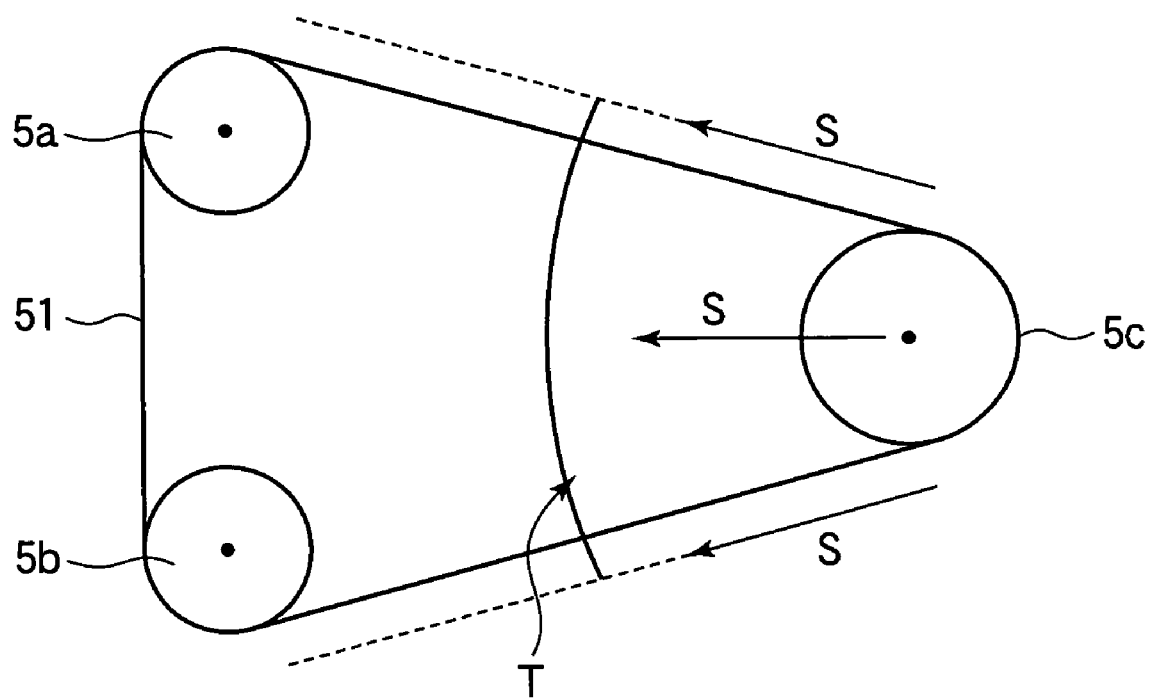
FIG. 31 is a schematic view showing a range of a stretching direction of the transfer belt the seventh embodiment of the present invention.

FIGS. 28, 29 and 30 are side views showing first, second and third states of the arm 63 according to the seventh embodiment of the present invention. FIG. 31 is a schematic view showing a range of a stretching direction of the transfer belt 51 in the seventh embodiment of the present invention.

In the above described first embodiment, during the correction of the skewing of the transfer belt 51 by means of the roller tilting lever 64 (FIG. 6), when the idle roller 53 is tilted and the transfer belt 51 is skewed in the direction away from the roller tilting lever 64, the roller tilting lever 64 rotates to shift downward due to the weight of the idle roller 53, as was described with reference to FIG. 11. In this state, the idle roller 53 is tilted in a direction in which the skewing of the transfer belt 51 is corrected.

In the above operation, the idle roller 53 is pushed by the spring 59 (i.e., a tension applying member). Therefore, when, for example, the shiftable end of the idle roller 53 reaches an uppermost position of the movable range M thereof as shown in FIG. 28, a counterforce F to the force of the spring 59 is generated along the line connecting the rotation axis O1 of the drive roller 52 and the rotation axis O2 of the idle roller 53 having been tilted upward.

In such a case, the rotation axis 63b of the arm 63 is on the same horizontal line as the rotation axis O1 of the drive roller 52, and therefore a counterclockwise moment Ma is generated on the rotation axis 63b of the arm 63 due to the counterforce F as shown in FIG. 28. With the moment Ma, the arm 63 is forced to rotate counterclockwise in FIG. 28, and may destabilize the movement of the roller tilting lever 64 (FIG. 6) caused by the weight of the idle roller 53.

Therefore, in the seventh embodiment, the rotation axis 63a of the arm 63 is disposed above the line connecting the rotation axis O1 of the drive roller 52 and the rotation axis O2 of the idle roller 53 (having been tilted to shift upward) as shown in FIG. 29. With such an arrangement, the clockwise moment Ma is generated on the arm 63 by the counterforce F. The clockwise moment Ma acts on the roller tilting lever 64 (FIG. 6) in the same direction (i.e., the downward direction) as the weight of the idle roller 53, and therefore the movement of the roller tilting lever 64 (FIG. 6) can be stabilized.

The operation of the belt drive device will be described.

In FIG. 30, a stretching angle (i.e., an angle between stretching directions of the transfer belt 51 wounded around the idle roller 53) is expressed as $2\omega$. The rotation axis 63a of the arm 63 is disposed above the bisector (angle $\omega$) of the stretching angle $2\omega$. Therefore, the clockwise moment Ma is generated by the counterforce F of the spring 59, and is applied to the arm 63. Accordingly, only the downward force is applied to the idle roller 53, so that the movement of the roller tilting lever 64 (FIG. 6) is stabilized. It is preferable that the position P of the rotation axis 63a of the arm 63 is above the bisector of the stretching angle $2\omega$ of the transfer belt 51 when the idle roller 53 is at the uppermost position of the movable range M. With such an arrangement, the movement of the roller tilting lever 64 (FIG. 6) can be further stabilized.

As described above, in the seventh embodiment, the rotation axis 63a of the arm 63 is disposed above the bisector of the stretching angle 2ω of the transfer belt 51 wound around the idle roller 53, and therefore the clockwise moment Ma is generated on the arm 63 by the counterforce F to the force of the spring 59. Only the downward force is applied to the idle roller 53, and therefore the movement of the roller tilting lever 64 (FIG. 6) is stabilized. Thus, the skewing of the transfer belt 51 can be prevented and the stable movement of the transfer belt 51 can be ensured. Preferably, by providing the rotation axis 63a of the arm 63 above the bisector of the stretching angle 2ω of the transfer belt 51 when the idle roller 53 is at the uppermost position of the movable range, it becomes possible to operate the roller tilting lever 64 (FIG. 6) in a further stable condition.

The belt drive device of the seventh embodiment shown in FIGS. 28 through 30 has two rollers having almost the same diameters around which the transfer belt 51 is wound. In such a configuration, the stretching direction of the transfer belt 51 is almost the same as the moving direction of the transfer belt 51. If the rollers having different diameters are used, or if three rollers 5a, 5b and 5c (FIG. 31) are used, the stretching direction S of the transfer belt 51 has a range T as shown in FIG. 31.

Each of the belt drive devices described as examples in the first through seventh embodiments is used to move the transfer belt in the electrophotographic printer. However, the present invention can be applied to a belt drive device (for example, a fixing device, a sheet feeding device or the like) having an endless belt and used in the electrophotographic printer. Further, the present invention is not limited to the use in electrophotographic printer, but can be applied to a belt drive device having an endless belt and used in other apparatus.

Each of the transfer belts described as examples in the first through seventh embodiments carries the recording media on which the image is formed. However, the present invention can be applied to, for example, a transfer belt of an electrophotographic printer of an intermediate transfer type in which the image is directly formed on the transfer belt and then the image is transferred form the transfer belt to the recording media.

While the preferred embodiments of the present invention have been illustrated in detail, it should be apparent that modifications and improvements may be made to the invention without departing from the spirit and scope of the invention as described in the following claims.

What is claimed is:

1. A belt drive device comprising:
a plurality of rollers;
an endless belt stretched around said rollers and driven by said rollers; and
a roller-shaft shifting member that shifts at least one end of a shaft of at least one roller of said plurality of rollers in a direction that is substantially perpendicular to an axial direction of said roller and substantially perpendicular to a stretching direction in which said endless belt is stretched, in accordance with a movement of said endless belt in said axial direction of said roller,
wherein, by said movement of said endless belt in said axial direction of said roller, said endless belt pushes said roller-shaft shifting member to cause said roller-shaft shifting member to move in a direction to shift said shaft of said roller in said direction perpendicular to said axial direction and perpendicular to said stretching direction.

2. The belt drive device according to claim 1, wherein said roller-shaft shifting member has a rotation axis tilted with respect to the axial direction of said roller, and rotates about said rotation axis to shift said shaft of said roller.

3. The belt drive device according to claim 1, further comprising an axial movement detection member for detecting the movement of said endless belt in the axial direction of said roller,
wherein said axial movement detection member engages a band-shaped resilient member provided on a circumference of said endless belt, and said roller-shaft shifting member shifts said shaft of said roller in accordance with the position of said axial movement detection member.

4. The belt drive device according to claim 1, further comprising an axial movement detection member that contacts a lateral end of said endless belt to detect the movement of said endless belt in the axial direction of said roller,
wherein said roller-shaft shifting member shifts said shaft of said roller in accordance with the position of said axial movement detection member.

5. The belt drive device according to claim 4, further comprising an axial movement detection member provided coaxially with said roller,
wherein said axial movement detection member moves in said axial direction of said roller.

6. The belt drive device according to claim 1, wherein said roller has a flange portion that contacts a lateral end of said endless belt, and is slidably supported by said shaft so as to move in the axial direction of said roller in accordance with the movement of said endless belt in the axial direction of said roller.

7. The belt drive device according to claim 1, further comprising a roller-shaft supporting member that movably supports said shaft of said roller, said roller-shaft supporting member being disposed on an end of said roller on the same side with said roller-shaft shifting member.

8. The belt drive device according to claim 7, wherein said roller-shaft supporting member has a rotation axis substantially parallel to said shaft of said roller, and is shiftable about said rotation axis, and
wherein said rotation axis is disposed above a bisector of an angle between stretching directions of said endless belt wounded around said roller.

9. A belt drive device comprising:
a plurality of rollers;
an endless belt stretched around said rollers and driven by said rollers; and
a roller-shaft shifting member that shifts at least one end of a shaft of at least one roller of said plurality of rollers in a direction that is substantially perpendicular to an axial direction of said roller and substantially perpendicular to a direction in which said endless belt is stretched, in accordance with the movement of said endless belt in said axial direction of said roller,
wherein said roller-shaft shifting member moves in the axial direction of said roller and also moves in said direction substantially perpendicular to said direction in which said endless belt is stretched, in accordance with the movement of said endless belt in the axial direction of said roller, so as to shift said shaft of said roller,
the belt drive device further comprising:
a belt frame that supports said roller; and
a tilted part provided on said belt frame, said tilted part being tilted with respect to the axial direction of said roller,
wherein said roller-shaft shifting member has a rotation axis substantially perpendicular to the axial direction of said shaft of said roller, and said roller-shaft shifting member rotates about said rotation axis and also moves in the direction of said rotation axis along said tilted part.

10. A belt drive device comprising:
a plurality of rollers;
an endless belt stretched around said rollers and driven by said rollers; and
a roller-shaft shifting member that shifts at least one end of a shaft of at least one roller of said plurality of rollers in a direction that is substantially perpendicular to an axial direction of said roller and substantially perpendicular to a direction in which said endless belt is stretched, in accordance with the movement of said endless belt in said axial direction of said roller,
wherein said roller-shaft shifting member moves in the axial direction of said roller and also moves in said direction substantially perpendicular to said direction in which said endless belt is stretched, in accordance with the movement of said endless belt in the axial direction of said roller, so as to shift said shaft of said roller, and
wherein said roller-shaft shifting member contacts a lateral end of said endless belt.

11. A belt drive device comprising:
a plurality of rollers;
an endless belt stretched around said rollers and driven by said rollers; and
a roller-shaft shifting member that shifts at least one end of a shaft of at least one roller of said plurality of rollers in a direction that is substantially perpendicular to an axial direction of said roller and substantially perpendicular to a direction in which said endless belt is stretched, in accordance with the movement of said endless belt in said axial direction of said roller,
wherein said roller-shaft shifting member moves in the axial direction of said roller and also moves in said direction substantially perpendicular to said direction in which said endless belt is stretched, in accordance with the movement of said endless belt in the axial direction of said roller, so as to shift said shaft of said roller, and
wherein two roller-shaft shifting members are provided on both ends of said shaft of said roller.

12. A belt drive device comprising:
a plurality of rollers;
an endless belt stretched around said rollers and driven by said rollers; and
a roller-shaft shifting member that shifts at least one end of a shaft of at least one roller of said plurality of rollers in a direction that is substantially perpendicular to an axial direction of said roller and substantially perpendicular to a direction in which said endless belt is stretched, in accordance with the movement of said endless belt in said axial direction of said roller,
wherein said roller-shaft shifting member moves in the axial direction of said roller and also moves in said direction substantially perpendicular to said direction in which said endless belt is stretched, in accordance with the movement of said endless belt in the axial direction of said roller, so as to shift said shaft of said roller, and
wherein said roller-shaft shifting member has a rotation axis tilted with respect to the axial direction of said roller, and rotates about said rotation axis to shift said shaft of said roller, and
wherein said roller-shaft shifting member rotates about said rotation axis, in accordance with the movement of said endless belt in the axial direction of said roller.

13. The belt drive device according to claim 12, further comprising an axial movement detection member provided coaxially with said roller, said axial movement detection member contacting a lateral end of said endless belt to detect the movement of said endless belt in the axial direction of said roller,
wherein said roller-shaft shifting member shifts said shaft of said roller in accordance with the position of said axial movement detection member.

14. A belt drive device comprising:
a plurality of rollers;
an endless belt stretched around said rollers and driven by said rollers; and
a roller-shaft shifting member that shifts at least one end of a shaft of at least one roller of said plurality of rollers in a rotational direction about an axis substantially parallel to a direction in which said endless belt is stretched, in accordance with the movement of said endless belt in the axial direction of said roller,
wherein said roller-shaft shifting member moves in the axial direction of said roller and also moves in said rotational direction about said axis substantially parallel to said direction in which said endless belt is stretched, in accordance with the movement of said endless belt in the axial direction of said roller, so as to shift said shaft of said roller,
wherein said roller-shaft shifting member has a rotation axis tilted with respect to the axial direction of said roller, and rotates about said rotation axis to shift said shaft of said roller,
wherein said roller-shaft shifting member rotates about said rotation axis, in accordance with the movement of said endless belt in the axial direction of said roller,
wherein the belt drive device further comprises an axial movement detection member provided coaxially with said roller, said axial movement detection member contacting a lateral end of said endless belt to detect the movement of said endless belt in the axial direction of said roller,
wherein said roller-shaft shifting member shifts said shaft of said roller in accordance with the position of said axial movement detection member, and
wherein said roller-shaft shifting member has a convex portion contacting said axial movement detection member.

15. A belt drive device comprising:
a plurality of rollers;
an endless belt stretched around said rollers and driven by said rollers; and
a roller-shaft shifting member that shifts at least one end of a shaft of at least one roller of said plurality of rollers in a rotational direction about an axis substantially parallel to a direction in which said endless belt is stretched, in accordance with the movement of said endless belt in the axial direction of said roller,
wherein said roller-shaft shifting member moves in the axial direction of said roller and also moves in said rotational direction about said axis substantially parallel to said direction in which said endless belt is stretched, in accordance with the movement of said endless belt in the axial direction of said roller, so as to shift said shaft of said roller,
wherein said roller-shaft shifting member has a rotation axis tilted with respect to the axial direction of said roller, and rotates about said rotation axis to shift said shaft of said roller,
wherein said roller-shaft shifting member rotates about said rotation axis, in accordance with the movement of said endless belt in the axial direction of said roller, wherein the belt drive device further comprises an axial movement detection member provided coaxially with said roller, said axial movement detection member contacting a lateral end of said endless belt to detect the movement of said endless belt in the axial direction of said roller, wherein said roller-shaft shifting member shifts said shaft of said roller in accordance with the position of said axial movement detection member, wherein said roller-shaft shifting member has a convex portion contacting said axial movement detection member, and wherein a plurality of said convex portions are arranged in a direction substantially perpendicular to said direction in which said endless belt is stretched.

16. The belt drive device according to claim 15, wherein said roller-shaft shifting member is rotated by being pushed by said axial movement detection member.

17. The belt drive device according to claim 16, further comprising a roller-shaft supporting member that movably supports said shaft of said roller, said roller-shaft supporting member being disposed on an end of said roller on the same side with said roller-shaft shifting member, wherein said roller-shaft supporting member has a rotation axis substantially parallel to said shaft of said roller, and is shiftable about said rotation axis, and wherein said rotation axis is disposed above a bisector of an angle between stretching directions of said endless belt wound around said roller.

18. A belt drive device comprising:

a plurality of rollers;

an endless belt stretched around said rollers and driven by said rollers; and a roller-shaft shifting member that shifts at least one end of a shaft of at least one roller of said plurality of rollers in a direction substantially perpendicular to a direction in which said endless belt is stretched, in accordance with the movement of said endless belt in the axial direction of said roller, wherein, when said direction in which said roller-shaft shifting member shifts said at least one end of said shaft is defined as a roller-shaft-shifting direction, and when said direction in which said endless belt is stretched is defined as a belt-stretch direction, said roller-shaft-shifting direction is a direction on a cross section of said roller that is formed by cutting said roller in the axial direction of said roller, said cross section of said roller being perpendicular to said belt-stretch direction, said roller-shaft-shifting direction on said cross section of said roller being an upward direction or a downward direction with respect to an axis of said roller.

* * * * *